(12) United States Patent
Kato et al.

(10) Patent No.: US 7,607,140 B2
(45) Date of Patent: Oct. 20, 2009

(54) DEVICE MANAGEMENT SYSTEM

(75) Inventors: Takatoshi Kato, Yokohama (JP); Takashi Tsunehiro, Ebina (JP); Tomihisa Hatano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 11/363,509

(22) Filed: Feb. 28, 2006

(65) Prior Publication Data
US 2007/0011446 A1   Jan. 11, 2007

(30) Foreign Application Priority Data
Jun. 9, 2005   (JP) .............................. 2005-169403

(51) Int. Cl.
*G06F 13/00* (2006.01)
*G06F 15/16* (2006.01)
*G06F 15/173* (2006.01)

(52) U.S. Cl. .................. 719/321; 709/217; 709/223

(58) Field of Classification Search ................ 709/229, 709/225, 219, 227, 223; 710/15, 200; 719/316, 719/321, 324, 327
See application file for complete search history.

(56) References Cited

U.S. PATENT DOCUMENTS

| | | | |
|---|---|---|---|
| 6,170,009 B1 * | 1/2001 | Mandal et al. .............. | 709/223 |
| 6,466,982 B1 * | 10/2002 | Ruberg ........................ | 709/227 |
| 6,546,419 B1 * | 4/2003 | Humpleman et al. ......... | 709/223 |
| 6,895,588 B1 * | 5/2005 | Ruberg ........................ | 719/321 |
| 6,904,489 B2 | 6/2005 | Zarns | |
| 7,167,919 B2 * | 1/2007 | Iwamoto et al. ............. | 709/229 |
| 2001/0047471 A1 * | 11/2001 | Johnson ........................ | 713/1 |
| 2004/0250130 A1 | 12/2004 | Billharz et al. | |
| 2005/0240712 A1 | 10/2005 | Klein | |

FOREIGN PATENT DOCUMENTS

JP   2005-012775   1/2005

* cited by examiner

*Primary Examiner*—Wing F Chan
*Assistant Examiner*—Jonathan Willis
(74) *Attorney, Agent, or Firm*—McDermott Will & Emery LLP

(57) ABSTRACT

In a client/server architecture system, a device management system having the function of safely sharing a device without compromising user convenience is provided.

The device is coupled to a terminal that the user uses or a hub coupled to a network. A device management manager having a device driver function and communication function installed on the terminal or the like, a virtual device manager having a device driver function and communication function installed on the server, and an authentication server that manages access permission for the device allow the device to be virtually available as in the case of the device directly coupled to the server while managing the access to the device.

5 Claims, 15 Drawing Sheets

FIG. 2

| 1401 | 1402 | 1403 | 1404 | 1405 | 1406 | 1407 | 1408 | 1409 | 1410 | 1411 |
|---|---|---|---|---|---|---|---|---|---|---|
| POLICY NUMBER | DEVICE NAME | ADDRESS OF CONNECTION APPLICATION | NETWORK INTERFACE ID OF CONNECTION APPLICATION | VENDOR ID | PRODUCT ID | SERIAL NUMBER | DEVICE TYPE | EXCLUSIVE CONTROL | AVAILABILITY | USAGE PERMITTED ID |
| 1 | * | * | * | 1001 | 1001 | * | * | NOT REQUIRED | ENABLED | {20000001, 20000010,...} |
| 2 | * | * | * | 1105 | * | * | B Ltd.* | REQUIRED | ENABLED | {20000011} |
| 3 | * | 192.168.1.1 | 00:00:00:00:00:01 | | | * | * | * | WARNING | * |
| ... | | | | | | | | | | |
| n | * | * | * | * | * | * | * | NOT REQUIRED | INHIBITED | NONE |

| DEVICE ID 201 | DEVICE NAME 202 | ADDRESS OF CONNECTION APPLICATION 203 | NETWORK INTERFACE ID OF CONNECTION APPLICATION 204 | VENDOR ID 205 | PRODUCT ID 206 | SERIAL NUMBER 207 | DEVICE TYPE 208 | EXCLUSIVE CONTROL 209 | STATUS 210 | USAGE PERMITTED ID 211 | USER ID 212 |
|---|---|---|---|---|---|---|---|---|---|---|---|
| 30000001 | DEVICE A | 192.168.1.1 | 00:00:00:00:00:01 | 1001 | 1001 | 10010301 | A Corp. USB CD-ROM | REQUIRED | EXCLUSIVELY IN USE | {20000001,20000010,....} | 10000001 |
| 30000002 | DEVICE B | 192.168.1.2 | 00:00:00:00:00:02 | 1105 | 1105 | A012CD02 | B Ltd. MC Reader writer | NOT REQUIRED | IN USE | {20000011} | 10000002 |
| 30000003 | DEVICE C | 192.168.1.3 | 00:00:00:00:00:03 | 1A15 | 1A15 | 101256A1 | XYZ Removable HDD | NOT REQUIRED | IN COMMUNICATION | {20000001,20000010,....} | 10000001 |
| 30000004 | DEVICE D | 192.168.1.4 | 00:00:00:00:00:04 | 20AA | 20AA | 00000012 | ABC Smartcard R/W | POSSIBLE | UNKNOWN | NOT DEFINED | 10000004 |
| 30000005 | DEVICE Z | 192.168.4.5 | 00:00:00:00:04:05 | C014 | A04A | 0520ADC1 | Z MCard R/W | POSSIBLE | UNKNOWN | NOT DEFINED | 10000004 |

| 301 USER ID | 302 USER NAME | 303 USER'S GROUP | 304 CERTIFICATE | 305 VALID DURATION | 306 AUTHENTICATION BY CERTIFICATE APPROVAL/DENIAL | 307 ENCRYPTION AND HASH TYPE | 308 PASSWORD | 309 PASSWORD AUTHENTICITY APPROVAL/DENIAL |
|---|---|---|---|---|---|---|---|---|
| 10000001 | USER A | {20000001,20000010,...} | CERTIFICATE A | ~2005/8/31 13:05 | APPROVED | 3DES-SHA1 | 12345678 | APPROVED |
| 10000002 | USER B | {20000011} | NOT DEFINED | NOT DEFINED | DENIED | NOT DEFINED | abcdefgh | APPROVED |
| 10000003 | USER C | {20000001,20000010,...} | CERTIFICATE C | NOT DEFINED | APPROVED | 3DES-SHA1 | NOT DEFINED | DENIED |
| 10000010 | USER D | NOT DEFINED | CERTIFICATE D | ~2005/10/1 23:59 | APPROVED | 3DES-SHA1 | NOT DEFINED | DENIED |
| 10000011 | USER E | {20000001,20000011,...} | CERTIFICATE E | 9:00~23:00 | APPROVED | 3DES-SHA1 | NOT DEFINED | DENIED |

FIG. 5

| 401 PC NAME | 402 NETWORK NAME | 403 IP ADDRESS | 404 MAC ADDRESS | 405 SOURCE TERMINAL | 406 SOURCE NETWORK NAME | 407 SOURCE IP ADDRESS | 408 SOURCE MAC ADDRESS | 409 USER ID | 410 STATUS | 411 TIME AT CONNECTION INITIATED | 412 TIME AT CONNECTION TERMINATED | 413 TIME AT OPERATION CHECKED |
|---|---|---|---|---|---|---|---|---|---|---|---|---|
| PC A | pc11 | 192.168.1.1 | 00:00:00:00:00:01 | PC F | pc34 | 192.168.3.4 | 00:00:00:00:03:04 | USER A | IN USE | 2005/1/1 13:05 | - | 2005/1/1 15:02 |
| PC B | pc12 | 192.168.1.2 | 00:00:00:00:00:02 | PC Z | pc45 | 192.168.4.5 | 00:00:00:00:04:05 | USER B | IN USE | 2005/1/1 14:12 | - | 2005/1/1 15:04 |
| PC C | pc13 | 192.168.1.3 | 00:00:00:00:00:03 | PC H | pc67 | 192.168.6.7 | 00:00:00:00:06:07 | USER C | CHECKING | 2005/1/1 9:12 | - | 2005/1/1 14:45 |
| PC D | pc14 | 192.168.1.4 | 00:00:00:00:00:04 | - | - | - | - | - | WAITING | - | 2005/1/1 11:05 | - |

Table 1000:

| 1001 NUMBER | 1002 TIME | 1003 DEVICE ID | 1004 DEVICE NAME | 1005 ADDRESS (SOURCE) | 1006 NETWORK INTERFACE ID (SOURCE) | 1007 APPLICATION ID | 1008 ADDRESS (HOST) | 1009 NETWORK INTERFACE ID (HOST) | 1010 APPLICATION ID |
|---|---|---|---|---|---|---|---|---|---|
| 1 | 2005:1/1 9:01:59 | - | DEVICE A | 192.168.1.4 | 00:00:00:00:00:04 | 40000004 | - | - | - |
| 2 | 2005:1/1 9:02:10 | - | DEVICE A | 192.168.1.4 | 00:00:00:00:00:04 | 40000004 | - | - | - |
| 3 | 2005:1/1 9:02:12 | 30000001 | DEVICE A | 192.168.1.4 | 00:00:00:00:00:04 | 40000004 | 192.168.0.1 | 00:00:00:01:00:01 | 40010001 |
| 4 | 2005:1/1 9:02:21 | - | - | 192.168.0.1 | 00:00:00:01:00:01 | 40010001 | - | - | - |
| 5 | 2005:1/1 9:02:25 | 30000001 | DEVICE A | 192.168.0.1 | 00:00:00:01:00:01 | 40010001 | 192.168.0.1 | 00:00:00:01:00:01 | 40010001 |
| 6 | 2005:1/1 9:02:59 | 30000001 | DEVICE A | 192.168.0.1 | 00:00:00:01:00:01 | 40010001 | 192.168.1.4 | 00:00:00:00:00:04 | 40000004 |
| 7 | 2005:1/1 9:03:19 | 30000002 | DEVICE D | 192.168.4.5 | 00:00:00:04:00:05 | 40000004 | 192.168.1.1 | 00:00:00:00:00:01 | 40000001 |
| 8 | 2005:1/1 9:03:50 | - | DEVICE Z | 192.168.4.5 | 00:00:00:04:00:05 | 40000004 | - | - | - |
| 9 | 2005:1/1 9:03:59 | - | DEVICE Z | 192.168.4.5 | 00:00:00:04:00:05 | 40000004 | - | - | - |
| 10 | | | | | | | | | |
| 11 | | | | | | | | | |
| ... | | | | | | | | | |

| 1011 VENDOR ID | 1012 PRODUCT ID | 1013 SERIAL NUMBER | 1014 DEVICE NAME | 1015 USER ID | 1016 INFORMATION | 1017 REMARKS |
|---|---|---|---|---|---|---|
| - | - | - | - | 00000001 | DEVICE MANAGEMENT MANAGER STARTED UP (192.168.1.4) | |
| 1001 | 1001 | 10010001 | A Corp. USB CD-ROM | 00000001 | DEVICE INFORMATION WAS ACQUIRED (192.168.1.4) | |
| 1001 | 1001 | 10010001 | A Corp. USB CD-ROM | 00000001 | DEVICE INFORMATION WAS SENT (192.168.1.4 → 192.168.0.1) | |
| 1001 | 1001 | 10010001 | A Corp. USB CD-ROM | 00000001 | DEVICE INFORMATION (30000001) WAS REGISTERED (192.168.0.1) | |
| - | - | - | - | 00000002 | AVAILABLE DEVICE SURVEY REQUEST (192.168.1.1 → 192.168.0.1) | |
| 1001 | 1001 | 10010001 | A Corp. USB CD-ROM | 00000001 | DEVICE AVAILABILITY INTERROGATION (192.168.0.1 → 192.168.1.4) | |
| 1001 | 1001 | 10010001 | A Corp. USB CD-ROM | 00000004 | AVAILABLE DEVICE REPLY (192.168.0.1 → 192.168.1.1) | |
| - | - | - | - | - | DEVICE MANAGEMENT MANAGER STARTED UP (192.168.4.5) | |
| C014 | A04A | 0520ADC1 | Z MCard R/W | - | DEVICE INFORMATION WAS ACQUIRED (192.168.4.5) | |
| ... | | | | | | |

DEVICE MANAGEMENT SYSTEM

INCORPORATION BY REFERENCE

This application claims priority based on a Japanese patent application, No. 2005-169403 filed on Jun. 9, 2005, the entire contents of which are incorporated herein by reference.

BACKGROUND OF THE INVENTION

The present invention relates to a technology which manages access to a device coupled to a server over a network. The invention particularly relates to a technology that allows safe and easy, remote operations in a system in which the device is virtually available as in the case where it is directly coupled to the server.

Available data transfer bandwidth per person in communicating over a network such as the Internet or an intranet has been broadened than ever. In addition to access from corporate in-house instruments to outside servers, one can even access corporate in-house instruments from home, hotel, hotspot, or other places at a bandwidth of several Mbps to several tens of Mbps. Full-time and inexpensive connection to the Internet from home or in urban areas is now available.

Information instruments such as personal computers (PCs), Personal Digital Assistants (PDAs), and cellular phones have been falling in price, allowing more enterprises to provide most of their employees with terminal devices for their business activities. Many enterprises have allowed their employees to access corporate in-house instruments such as servers and PCs by using information instruments outside their offices, for example, on business trips, at homes, or during traveling for performing their business activities in a prompt manner.

Such access is referred to as remote access functionality, in which a server with virtual private network (VPN) functionality for encrypted communication is installed in-house and the server controls the communication with external information terminals, for example, by encrypting the communication along the communication path. As the external remote access becomes common practice, work systems are changing in such a way that in addition to performing part of business activities by accessing a mail server or web server remotely, most of the in-company business activities are carried out at remote locations.

As one approach to address such a work system, a system operation method called client/server architecture may be introduced. A client/server architecture system is also called a network computing system or server based computing system, in which main programs and data are stored on servers and manipulated from clients such as PCs or thin-clients. In client/server architecture, computing and data storage are performed primarily on the servers, which reduces the need for and frequency of tasks on the clients, such as thin-clients, that would be otherwise necessary, including upgrade and bug fix for the OS and business applications as well as combating and disinfecting viruses, resulting in reduced overall management cost and increased security (See, for example, Japanese Patent Laid-open Publication No. 2005-12775).

SUMMARY OF THE INVENTION

In the above mentioned client/server architecture, servers and clients may be located physically remote from each other.

In such client/server architecture, one way for the user to use a peripheral instrument (hereinafter referred to as "device") such as a CD-ROM drive or a printer, which is coupled to an information instrument, is to directly couple the device of interest to the server. In this case, a client can use the device through the driver of the device on the server without having to install the driver on the client. The device can also be shared by multiple clients. In this case, however, since there is no driver for the device (e.g., a CD-ROM drive) directly coupled to the server in the client operation environment, certain operations such as removing CD-ROM media cannot be performed.

Another way is to place the device of interest as a shared device on a network such as an intranet, install the device driver on a client, and use the device through the driver. This arrangement, however, is problematic in terms of security because a third party having the device driver may gain unauthorized access to the device unless action, such as access control, is taken after the CD-ROM has been inserted into the CD-ROM drive. In particular, when the server exists on a network, the shared device virtually coupled to the server and available to multiple clients presents security risk, which requires sufficient security measures such as authentication and encryption.

In the case of a common device such as a CD-ROM drive, it is possible to share the device according to this method because each client may have the driver and the OS of the server and clients will likely provide device sharing capability. However, in the case of a special device that requires a specially functioning driver, it is difficult to share the device in a configuration in which the clients are provided with the device driver because a dedicated function is required for sharing the device and Operating Systems (OS) generally do not, in most cases, provide such a function.

The present invention has been made in view of the above circumstances and provides improved system security without compromising user convenience when a device is shared in client/server architecture.

Thus, the invention manages access permission for a device that is coupled to a network and virtually operates on a server.

Specifically, in a system in which a server that executes an application program, a client that instructs the server to execute the application program and receives the execution result from the server, and an authentication server that authenticates the client are coupled over a network, there is provided a device management system that controls a device coupled to the client from the server, the device management system characterized in that:

the client includes device manager that sends and receives data to and from a device driver of the device coupled to the client, as well as sends and receives the data to and from the server, the authentication server includes device information holding unit that manages usage permission for each device in the device management system, the server includes virtual device manager that controls the data transmission and reception over the network between the application running on the server and the device manager in accordance with the usage permission held in the device information holding unit.

According to the invention, the system security can improve without compromising user convenience when a device is shared in client/server architecture.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 2 is one example of the policy table of the first embodiment.

FIG. 3 shows one example of the device information table of the first embodiment.

FIG. 4 is one example of the user information database held by the device management and authentication server of the first embodiment.

FIG. 5 is one example of the PC usage management table held by the blade server of the first embodiment.

FIG. 11 is one example of the log management view displayed by the management application.

DETAILED DESCRIPTION OF THE EMBODIMENTS

Figure 1:
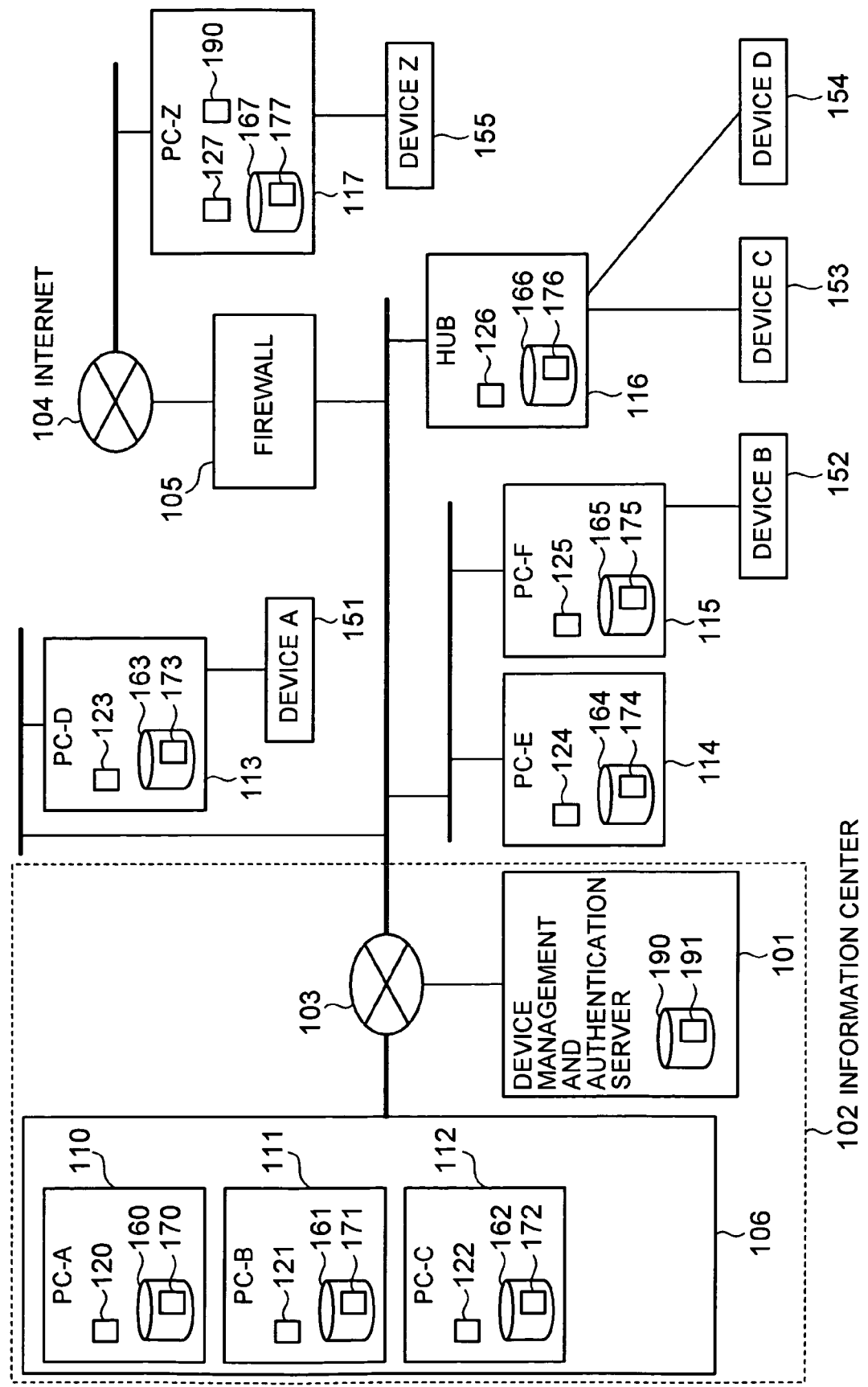
FIG. 1 is a block diagram of the device management system of the first embodiment.

Embodiments of the invention will be described in detail with reference to the accompanying drawings.

First Embodiment

A first embodiment of the device management system according to the invention will be described with reference to the drawing.

FIG. 1 is a detailed block diagram of the device management system of the present embodiment. The device management system of the embodiment includes an information center 102 including a device management and authentication server 101, a network 103, and a blade server 106; and a client apparatus, such as a PC, coupled to the network 103 of the information center.

The information center 102 manages information instruments, and is an area where entering and leaving the center are usually controlled and the instruments installed therein are managed and monitored. The setup of the information center 102 is not limited to a specific location. For example, it may be located where a user uses a terminal such as a client apparatus, or may be remotely located therefrom. If the user uses the terminal in his/her office or the like, the information center 102 may be located in the building of the corporation that manages the user. If the user is a general consumer and uses a server of a service provider at home, hotel, street facility or the like, the information center 102 may be located in the building that is managed by an Internet service provider, server rental company, application service provider, or the like. The information center 102 may be an area where servers are collectively placed in a section of the user's home or office.

The device management and authentication server 101 authenticates and manages devices and users, and is managed by an administrator of the information center 102. To achieve this, the device management and authentication server 101 holds various data, which will be described later. The device management and authentication server 101 is implemented as an information processing apparatus comprising a communication interface, a CPU, and a memory, and performs various functions by the CPU executing programs stored in the memory. The programs which implement the functions may also be obtained from other apparatus via storage media or communication media including carriers, digital signals, or communication lines.

The blade server 106 is an apparatus including a plurality of servers or PCs therein and is provided with, although not shown, a power supply, an interface function which connects internal instruments and the network 103, a management apparatus, and the like. In the present embodiment, the blade server 106 will be described, by way of example, with respect to PC-A 110, PC-B 111, and PC-C 112 incorporated therein. The configuration of the blade server 106 is, of course, not limited to the above, but the blade server 106 may be removably provided with other PCs or servers.

The network 103 connects the device management and authentication server 101, PC-A 110, PC-B 111, PC-C 112, and the like to each other. In the present embodiment, the network 103 will be described as a network using TCP/IP as the communication protocol. The network 103 may, of course, communicate in accordance with other protocols.

Although the PC-A 110, PC-B 111, and PC-C 112 in the present embodiment are arranged in the blade server 106, they may not be located in the blade server 106 or even in the information center 102 as long as they reside on the network 103. Although the PC-A 110, PC-B 111, and PC-C 112 are described as PCs, they are not particularly limited thereto and may be servers, workstations, or built-in instruments as long as they are information instruments in which OS and application programs stored on the storage media are executed on the memory and CPU.

Figure 15:
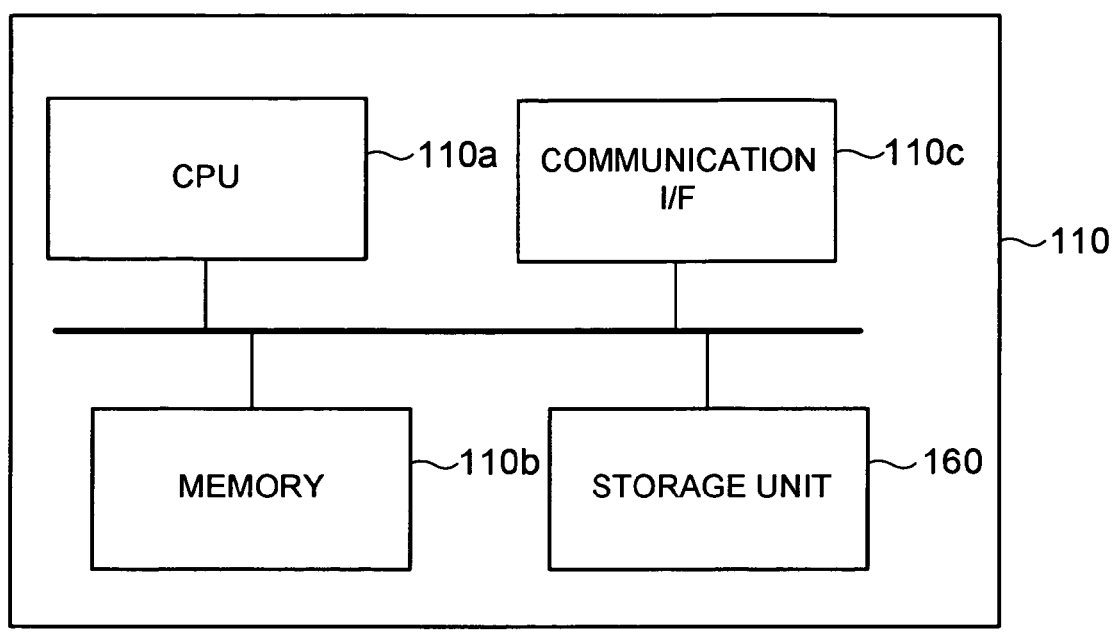
FIG. 15 is a hardware configuration view of the PC-A of the first embodiment.

FIG. 15 is a hardware configuration view of PC-A 110. PC-A 110 includes a storage unit 160 such as a hard disk drive or a flash memory, a memory 110b, a CPU 110a, and a communication interface 110c that is an interface for communication. In the PC-A 110, each of the processing portions is accomplished by the CPU executing programs read into the memory. The programs may also be obtained from other apparatus via storage media or communication media. The communication media include carriers, digital signals, or communication lines.

The PC-A 110 performs computing operations in accordance with instructions from the user. The computed results are displayed on a display, not shown, coupled to the PC-A 110 or blade server 106. The storage unit 160 has a virtual device manager 120 installed thereon by the administrator. When the PC-A 110 starts up, the OS is read from the storage unit 160 into the memory 110b, executed by the CPU 110a, and brought into the ready-to-use state, then the virtual device manager 120 is read into the memory 110b, and executed by the CPU 110a, and the virtual device brought into the ready-to-use state.

The term "virtual device manager" as used herein is a mechanism that makes a device coupled to the PC-A 110 over the network 103 or the like available as if the device were directly coupled to the PC-A 110. This mechanism makes a device coupled at a remote site available as in the case of a device physically coupled to the PC-A 110.

The virtual device manager 120 is a control software program which sends and receives data to and from a device A 151 coupled to the PC-A 110 over the network 103. The virtual device manager 120 functions to make the device A 151 virtually available as in the case of direct connection of the device A 151 to the server. Details of the virtual device manager 120 will be described later along with the operation of a device management manager 123 that will be described later as well.

The data that the virtual device manager 120 has sent and received as well as the events that have occurred in the virtual device manager 120 are accumulated on the storage unit 160 as a log 170. Details of the log 170 will be described later.

The PC-B 111 and PC-C 112 are also configured similar to the PC-A 110, and have storage units 161 and 162 respectively incorporated therein and virtual device managers 121 and 122 respectively installed therein, which will operate after startup. The following description will be provided with respect to the PC-A 110, when it is not required to distinguish the PC-A 110, PC-B 111, and PC-C 112 from each other.

The storage units 160 to 162 may reside on the network 103 instead of in the blade server 106.

Instruments coupled to the network 103 as client apparatus will be described.

In the present embodiment, the following description will be provided, by way of example, with respect to the case in which a PC-D 113, PC-E 114, PC-F 115, hub 116, and PC-Z 117 that is coupled via a firewall 105 and the Internet 104 are provided as client apparatus. The description will also be provided, by way of example, with respect to the case in which a device A 151 is coupled to the PC-D 113, a device B 152 is coupled to the PC-F 115, devices C 153 and D 154 are coupled to the hub 116, and a device Z 155 is coupled to the PC-Z 117. The way each of the clients and devices is coupled is not limited to the above configuration.

The PC-D 113 is an information processing apparatus that performs computing operations in accordance with instructions from the user, uses the device as required, and presents the computed results to the user. Hardware configuration and the way each of the processing portions is implemented are basically similar to the PC-A 110. The PC-D 113 is coupled to the network 103 through a network interface, not shown. The PC-D 113 includes a storage unit 163 such as a hard disk drive or flash memory as well as a memory and CPU, not shown, and performs computing operations in accordance with instructions from the user. The computed results are displayed on a display, not shown, coupled to the PC-D 113. The instructions from the user are sent to the PC-D 113 through a user interface, such as a keyboard or mouse, not shown.

The storage unit 163 of the PC-D 113 has a device management manager 123 installed thereon. When the PC-D 113 starts up, the OS is read from the storage unit 163 into the memory, executed by the CPU, and brought into the ready-to-use state, then the device management manager 123 is read into the memory, executed by the CPU, which makes the coupled device A 151 available from the PC-A 110 as a virtual device. The data or the like that the device management manager 123 has sent and received are accumulated on the storage unit 163 as a log 173. Details of the log 173 will be described later.

The device management manager 123 is a software program that allows the PC-D 113 to make the device A 151 available as a virtual device of the PC-A 110 of the blade server 106. Details of the device management manager 123 will be described later along with the operation of the virtual device manager 120.

The PC-E 114, PC-F 115, and PC-Z 117 are basically configured similar to the PC-D 113 and include storage units 164, 165, and 167 respectively. These storage units store logs 174, 175, and 177 respectively.

The hub 116 is an apparatus from which part of general PC's functions, such as a display screen, is removed. That is, the hub 116 is coupled to the network 103 through a network interface, not shown, and includes a storage unit 166 such as a hard disk drive or flash memory as well as a memory and CPU, not shown, to perform computing operations. Hardware configuration and the way each of the processing portions is implemented are basically similar to the PC-A 110. The hub 116 implements a device management manager 126 and holds a log 176 on its storage unit 166. The following description will be provided with respect to the PC-D 113, when it is not required to distinguish the PC-D 113, PC-E 114, PC-F 115, PC-Z 117, and hub 116 from each other.

The device A 151 is a peripheral instrument, such as a CD-ROM drive or a printer, coupled to an information instrument. The device A 151 is coupled to the PC-D 113 through an interface for device connection. Conceivable interfaces for device connection are those for connecting a device to a PC, such as Universal Serial Bus (USB), wireless USB, near-field wireless communication interface, infrared communication interface, serial port interface, parallel port interface, IEEE 1394 interface, PS/2® interface, and audio interface. In the present embodiment, the description will be provided, by way of example, in the case in which the interface is USB, but not limited thereto.

Also, in the present system, the device A 151 is used as a virtual device through the device management manager 123 installed in the PC-D 113 to which the device A 151 is coupled. Hereinafter, the device management manager 123 is referred to as the device management manager managing the device A 151.

The other devices B 152, C 153, and D 154 coupled to the PC and hub respectively are also peripheral instruments similar to the device A 151 and coupled to the PC or hub through a USB interface, by way of example in the present embodiment. The following description will be provided with respect to the device A 151, when it is not required to distinguish the devices A 151, B 152, C 153, and D 154 from each other.

A policy table 1400, a device management table 200, and a user information database 300 held by the device management and authentication server 101 will be described. The device management and authentication server 101 in conjunction with the virtual device manager 120 and the device management manager 123 control access to each of the devices.

The policy table 1400 has access policies registered thereon for the devices managed by the administrator in the present system. For example, usage permission for each device, usage permission depending on the client apparatus to which a device is coupled, and the like are registered in the policy table 1400. This table is pre-specified by the administrator or the like. The system administrator can freely change the policy table 1400. It is also possible to configure the system such that rules in the device information table 200 cannot be changed automatically but only manually by leaving the policy table 1400 unspecified. The administrator configures the policy table 1400 in accordance with policies that the administrator should specify for the system he/she manages.

FIG. 2 shows one example of the policy table 1400. As shown in this figure, for each policy, the policy number 1401, device name 1402, address of the connection application 1403, network interface ID of the connection application 1404, vendor ID 1405, product ID 1406, serial number 1407, device type 1408, exclusive control 1409, availability 1410, and usage permitted ID 1411 are recorded in the policy table 1400. Other items may of course be recorded.

The policy number 1401 is an identification number that is automatically assigned to each policy when the administrator registers a policy in the policy table 1400. When the number of the instruments or devices available in the system increases or decreases, a record of the device information table 200, which will be described later, is created according to the policies registered in the policy table 1400. When the number of the instruments or devices that follow a plurality of policies increases or decreases in the system, these policies are applied in a predetermined order.

The device name 1402, address of the connection application 1403, network interface ID of the connection application 1404, vendor ID 1405, product ID 1406, serial number 1407, and device type 1408 have the same contents as those recorded in the device information table 200, which will be described later, and indicate information on the instrument or device. The administrator specifies relevant conditions of the device name, address of the connection application, network interface ID of the connection application, vendor ID, product ID, serial number, and device type for each policy. Details of these conditions will be described in the description of the device information table 200.

The exclusive control 1409 is a value that, when a user uses the device, defines whether or not to prohibit any other user from using the device. Specifiable values are "required", "possible", "not required", and "not inquired (*)". Although "not inquired (*)" is basically handled similarly to "not required", it may be configured to be automatically specified for each device type or class, where the class is the type of a device that operates through the same device driver (class driver), such as a keyboard, storage unit, and the like.

Availability 1410 is the response of the device management and authentication server 101 when it is asked to give permission for the device. Specifiable values are "enabled", "inhibited", and "warning". A policy specified with "enabled" is the one that makes the relevant instrument or device automatically available to the user or users listed in the section of the usage permitted ID 1411 that will be described later. A policy specified with "inhibited" is the one that makes the relevant instrument or device automatically unavailable to the user or users listed in the section of the usage permitted ID 1411 that will be described later. A policy specified with "warning" is the one that, after displaying a warning, makes the relevant instrument or device automatically available to the user or users listed in the section of the usage permitted ID 1411 that which will be described later. The warning to be displayed can be specified for each policy.

The mark "*" in the figure means "not inquired" (no definition). The device management and authentication server 101 verifies whether the recorded information matches with the actual information.

For example, in FIG. 2, a policy 1 for the policy number 1401 specifies "not inquired" for the device name 1402, address of the connection application 1403, network interface ID of the connection application 1404, serial number 1407, device type 1408. That is, when an inquiry is made for the policy for the device whose vendor ID 1405 is "1001" and product ID 1406 is "1001", the exclusive control 1409 is recorded as "not required", the availability 1410 is recorded as "enabled", and the usage permitted ID 1411 is recorded as "20000001, 20000010, etc" in the device information table 200 regardless of the device name, address of the connection application, network interface ID of the connection application, serial number, and device type of the policy.

The policy 2 for the policy number 1401 automatically specifies "required" in the exclusive control section and "20000011" in the usage permitted ID section only for a device whose vendor ID is "1105" and device type starts with "B Ltd."

The policy 3 for the policy number 1401 automatically displays "not inquired" in the exclusive control section 1409 and "warning" in the availability section 1410 for a device coupled to the client apparatus whose address of the connection application 1403 is "192.168.1.1" and network interface ID of the connection application 1404 is "00:00:00:00:00:01", and specifies the device available to all users.

The policy n for the policy number 1401 specifies "inhibited" for all devices. That is, when a request is made for registering a device unregistered in the policy table 1400, the device management and authentication server 101 refers to the sections labeled with n for the policy number 1401 and specifies the exclusive control 1409 with "not required" and the availability 1410 with "inhibited" in the device information table 200.

The device information table 200 will be described. The device information table 200 manages information necessary for managing access to each device coupled to the present system. Each record to be registered in the device information table 200 is created in accordance with various device identifying information (hereinafter referred to as "device information") sent from the device management manager 123 along with a request (hereinafter referred to as "device connection request") for making the device that the device management manager 123 manages sharable, plus a policy or policies registered in the policy table 1400. The virtual device manager 120 controls availability of each device using the device information table 200.

When a device has been coupled or removed, the device management manager 123 sends, as the device information, at least information identifying the request-sending client apparatus on the network 103 (the IP address and MAC address in the present embodiment), information identifying the device of interest (the vendor ID, product ID, and serial number in the present embodiment), and information indicative of whether the device has been coupled or removed. The device management and authentication server 101 creates a record in accordance with the policy table 1400 and registers it in the device information table 200.

When the client apparatus itself is removed from the network 103, information identifying the client apparatus and information indicative of the removal thereof are sent to the device management and authentication server 101.

The device management and authentication server 101 updates the device information table 200, for example, when the system configuration that the device management and authentication server 101 manages has been changed, including when the number of the devices has increased or decreased, when a client apparatus has been removed, when the number of the users who use the system has increased or decreased, and when the network configuration has been changed; when records in the policy table 1400 have been changed; and when the device management and authentication server 101 has received an instruction from the administrator for updating the device information table 200. Also, as described later, the status will be updated every predetermined period.

FIG. 3 shows one example of the device information table 200. As shown in the figure, the device information table 200 includes the device ID 201, device name 202, address of the connection application 203, network interface ID of the connection application 204, vendor ID 205, product ID 206, serial number 207, device type 208, exclusive control 209, status 210, usage permitted ID 211, and user ID 212.

The device ID 201 uniquely identifies each device to be managed and is automatically created whenever a new registration request is made. It is a temporal ID that will likely change whenever the device management and authentication server 101 or the device management manager 123 starts or ends, whenever a device is inserted or removed, or the like.

The device name 202 is the name of the device by which the device is easily referred to, and pre-specified by the administrator or user. When specified by the administrator, the device name is registered in the policy table 1400. When a record of the device information table 200 is created, the device name is extracted from the policy table 1400 and registered. When specified by the user on the other hand, the device name is included in the device information, which is informed to the device management and authentication server 101.

The address of the connection application 203 records the IP address of the client apparatus to which the device is coupled (PC-D 113 for the device A 151). This is sent as the device information. This address will likely change even in use as appropriate, for example, when the client apparatus is moved from one subnet to another.

The network interface ID 204 records the number indicative of the network interface ID of the client apparatus to which the device is coupled (PC-D 113 for the device A 151). When the network uses the TCP/IP protocol as in the present embodiment, the Media Access Control (MAC) address is used as the network interface ID. Unlike the address of the connection application, the network interface ID 204 is unique to the instrument and will not change unless the instrument is changed.

The vendor ID 205, product ID 206, and serial number 207 are device identification numbers that have been preassigned to the device itself and obtained as the device information when the device is coupled to the client apparatus (PC-D 113 for the device A 151). These pieces of information are sent from the client apparatus to the device management and authentication server 101 as the device information. Each device is identified by a set of the vendor ID 205, product ID 206, and serial number 207. The vendor ID and product ID are uniquely assigned for each vendor and product. The serial number is assigned individually to each product.

The device type 208 is the name that the vendor or administrator assigns for user' understanding. When assigned by the vendor, the device type 208 is extracted from device information such as a descriptor and included in the device information for notification. When assigned by the administrator on the other hand, it is pre-registered in the policy table 1400.

The exclusive control 209 is the definition information indicative of, when a user uses the device, whether or not to prohibit any other user from using the device. When the exclusive control 209 is specified as "required", exclusive control is provided for the use of the device and the device is protected from other users' access from the start to the completion of the use of the device by the user. When the exclusive control 209 is specified as "possible", the device is protected from other users' access only when information is being sent or received to or from the device. When the exclusive control 209 is specified as "not required", exclusive control is not provided. This information is extracted from the policy table 1400 and registered.

The status 210 is the information indicative of the device usage status. The device management and authentication server 101 obtains this information by polling each coupled client apparatus every predetermined period. When the status 210 is "exclusively in use", it indicates that the user is using the device while exclusive control is provided. When the status 210 is "in use", it indicates that the user is using the device while exclusive control is not provided. When the status 210 is "in communication", it indicates that exclusive control is provided only during the communication and the user discontinues the exclusive usage of the device as soon as the communication ends. When the status 210 is "unknown", it indicates, for example, that the device management manager 123 is unable to communicate without notification to the device management and authentication server 101. After the status 210 has become "unknown" and a fixed time has passed, the device management and authentication server 101 controls to terminate the relevant device management manager 123 as well as the device A 151 coupled to the PC-D 113 on which the relevant device management manager 123 is installed. When the status 210 is "discoupled", it indicates that the virtual device manager 120 can communicate with the device management manager 123, but the device management manager 123 cannot communicate with the device A 151. When the status 210 is "not in use", it indicates that no client apparatus is using the device.

The usage permitted ID 211 records the ID of the user or group who will be given permission for connection to the device of interest. This information is extracted from the policy table 1400. When a plurality of users or groups is given permission for connection to the device, IDs of all of the permission-holding users or groups are registered. The usage permitted ID 211 may be not defined, that is, may have no registered IDs. If not defined, any user or group will be given permission for connection.

The user ID 212 records the ID of the user who is currently using the device of interest. The device management and authentication server 101 obtains this information by polling each coupled apparatus every predetermined period.

A user information database 300 held by the device management and authentication server 101 will be described. When a user requests for connection to an instrument in the information center 102 from an instrument that is outside the information center 102 but coupled to the network 103, the database 300 is used to determine (authenticate) whether the connection-requesting user has acceptable user permission. This database is pre-registered by the administrator.

FIG. 4 is one example of the user information database 300 held by the device management and authentication server 101. As shown in the figure, the user information database 300 registers each of the following items for each user: the user ID 301, user name 302, the user's group 303, certificate 304, valid duration 305, authentication by certificate approval/denial 306, encryption and hash type 307, password 308, and password authenticity approval/denial 309.

The user ID 301 identifies the user and is preassigned for each user. It will not usually change unless the usage permission of the user changes. The user name 302 is a text string indicative of the name of the user. The user name 302 is used to display the usage information. The user's group 303 is the information indicative of the group the user belongs to. In the present embodiment, various usage permissions are arranged to be assigned on a group basis. The user's group 303 indicates the group having the rights that every user in that group is granted. One user may belong to a plurality of groups, that is, the user's group 303 may register a plurality of groups. The user's group may not be defined. When not defined, the user does not have any usage permissions.

The certificate 304 is the information identifying the public key certificate to be used to authenticate the user. The public key certificate recorded as the certificate 304 is required to have validity verifiable in the device management and authentication server 101. For example, the device management and authentication server 101 may be configured to have a certificate authority therein for issuance of certificates.

The valid duration 305 is the duration during which the user has a right to use a PC or device in the blade server 106. When the valid duration 305 is not defined, the user does not have a right to use a PC. The valid duration 305 can be expressed using year, month and day, or can be expressed in various forms, such as every Monday, 8:15 to 17:15 everyday, or the like. The valid duration 305 can be specified independent of the valid duration of the public key certificate shown on the certificate 304.

The authentication by certificate approval/denial 306 is the information indicative of whether the authentication by certificate is approved or denied. The encryption and hash type 307 is the information indicative of the type of the encryption and hash using admitted public key infrastructure for authentication. When the encryption and hash type 307 is not defined, the device management and authentication server 101 will accept any encryption and hash type. Nevertheless, authentication cannot be performed by a method that is not implemented in the client (the PC used by the user, for example) or the like. The password 308 is a password for password-based authentication. As the password 308, recorded is a hash value or encrypted information. The password authenticity approval/denial 309 is the information indicative of whether or not the password can be used for authentication.

The blade server 106 checks the authentication information with the device management and authentication server 101 and obtains authentication if the user is granted a right with which the user can use a PC in the blade server 106 through authentication using a password based on the user information database 300 or public key infrastructure.

In the present embodiment, the authentication is performed in two phases by checking 1) whether or not the accessing user has access permission for the blade server 106, and 2) after the PC-A 110 in the blade server 106 has been assigned, whether or not the user has permission for using the resources of the PC-A 110 (programs and/or virtual devices). In either case, the user sends an authentication request including at least user authentication information to the blade server 106 or PC-A 110. The blade server 106 or PC-A 110 that received the authentication request accesses the device management and authentication server 101, and checks the authentication information with the record registered in the user information database 300 for authentication. The user authentication information herein is the user ID and password, or the signature corresponding to the public key information registered for each user.

A PC usage management table 400 used to manage the usage status of each PC in the information center 102 will be described. FIG. 5 is one example of the PC usage management table 400 held by the blade server 106.

The PC usage management table 400 registers, for each PC in the information center 102, the PC name 401, network name 402, IP address 403, MAC address 404, source terminal 405, source network name 406, source IP address 407, source MAC address 408, user ID 409, status 410, time at connection initiated 411, time at connection terminated 412, and time at operation checked 413.

The PC name 401 identifies the PC in the information center 102. A unique name is predefined for the PC name 401 and registered by the administrator. The network name 402 is used to identify the PC on the network. A unique name is predefined for the network name 402 and registered by the administrator. For each PC, the network name 402 and the PC name 401 may be the same or different.

The IP address 403 is the address that is assigned to each PC. The MAC address 404 is the address that is uniquely assigned to the network interface of each PC.

The source terminal 405 is the name of the current client apparatus that is remotely operating the PC in the information center 102. Again, a unique name is predefined for the source terminal 405 and registered by the administrator. The administrator can freely specify and change the name. When the PC in the information center 102 is not used by any client apparatus, the source terminal 405 is not defined. The source network name 406 is used to identify the source terminal 405 on the network 103. A unique name is predefined for the source network name 406 and registered by the administrator. The source terminal 405 and the source network name may be the same.

The source IP address 407 is the IP address of the client apparatus. The source MAC address 408 is the address that is uniquely assigned to the network interface of the client apparatus.

The user ID 409 is the user ID of the user who is using the client apparatus. The user ID 409 is not defined when the client apparatus is not used.

The status 410 is the information indicative of whether or not the PC of interest is in use. Information recorded in the section of the status 410 includes the following three: "in use", "checking", and "waiting". When the PC has the status 410 of "in use", it indicates that the PC is being used by the user having the ID registered in the user ID 409 section through the client apparatus identified by the source terminal 405. When the PC has the status 410 of "checking", it indicates that the device management and authentication server 101 is checking whether or not the PC is being used by the client apparatus or the checking process has not completed. When the PC has the status 410 of "waiting", it indicates that the client apparatus is waiting to use the PC, that is, the client apparatus is not using the PC.

The time at connection initiated 411 is the time when the user identified by the user ID 409 started operating the PC through the client apparatus identified by the source terminal 405. The time at connection terminated 412 is the time when the user identified by the user ID 409 stopped operating the PC through the client apparatus identified by the source terminal 405. The time at operation checked 413 is the time when the virtual device manager 120 last communicated with the device management and authentication server 101, for example, when the channel was created or deleted.

The blade server 106 updates this database whenever the usage status of each constituent PC changes.

A process of setting a device sharable and sharing the device after the setting (hereinafter referred to as "device sharing process") in the device management system of the present embodiment will be described. The process will be described, by way of example, with respect to the case in which the user uses the client apparatus PC-D 113 to remotely operate the PC-A 110 that is a constituent instrument of the blade server 106 in the information center 102, and make the device A 151 coupled to the PC-D 113 sharable. Naturally, the same procedure of device sharing applies to other cases in which other user terminals, other constituent instruments of the blade server 106, or other devices are involved.

Figure 6:
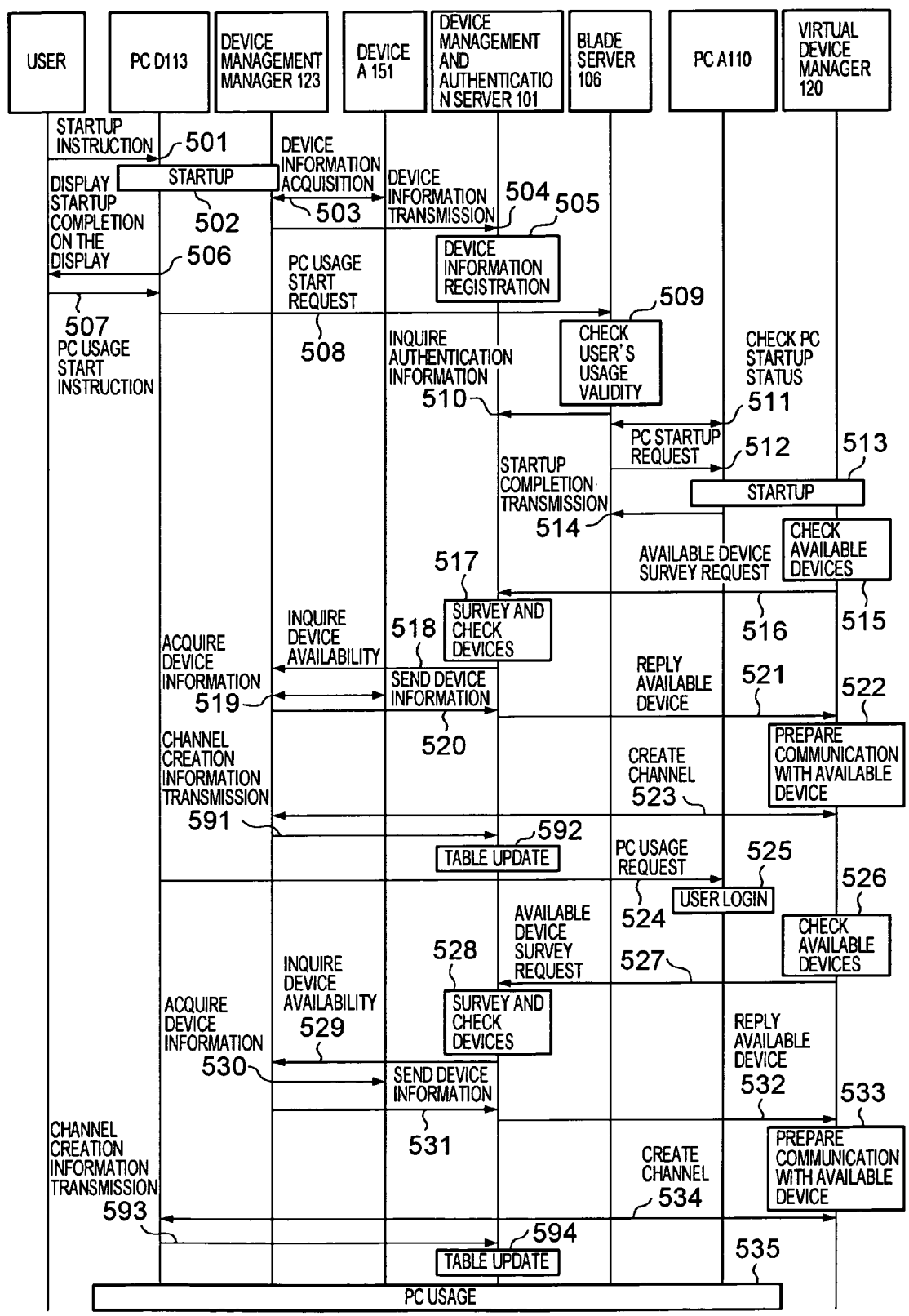
FIG. 6 is the process flow diagram of the device sharing process of the first embodiment.

FIG. 6 is a process flow diagram of the device sharing process in the above example.

The user instructs the PC-D 113 to start up (501). The PC-D 113 that received the startup instruction from the user loads the OS and/or applications from the storage unit 163 and starts them (502). The OS and/or applications may be loaded from a storage unit on the network. The device management manager 123 also starts up at this time.

The device management manager 123 that started up in the step 502 acquires information on the device A 151 coupled to the PC-D 113 (503). The information on the coupled device is acquired during startup in response to a request from the host (PC-D 113 in the present embodiment) through descriptor information, which is the data regarding information of the overall device, sent from the device to the host (504). The descriptor includes, for example, the code indicative of the device type, device class code, manufacturer/vendor ID of the device, product ID, and serial number. Based on the data of the device information acquired at step 503, the PC-D 113 reads and operates the device driver that drives the device A 151. The device management manager 123 implements the function of the driver or filter driver of the device that the device management manager 123 manages (the device A 151 in this case), makes the device sharable in the system, and controls information that the device sends and receives.

The device management manager 123 checks the operation of the device A 151 coupled to the PC-D 113, and then sends the device management and authentication server 101 the device information extracted from the device information of the device A 151 acquired at step 503 along with a device connection request (504). When the device management and authentication server 101 receives the device connection request and the device information, it checks the information against the data in the policy table 1400 and registers the policy for the device-connection-requesting device in the device information management table 200.

On the other hand, upon completion of the startup process, the PC-D 113 displays on the display that the startup process has completed (506). The user recognizes the completion of the startup process and instructs that the user starts using a constituent PC of the blade server 106 in the information center 102. In the present embodiment, the instruction of usage start is the entry of the user ID and password.

Upon receipt of the usage start instruction from the user (507), the PC-D 113 sends the received user authentication information to the blade server 106 as a request for using the blade server 106 (hereinafter referred to as "server usage start request") (508).

Upon receipt of the server usage start request, the blade server 106 authenticates the user by checking if the user has an appropriate usage permission for using the blade server 106 (509). Specifically, the blade server 106 sends the user ID and password included in the usage start request to the device management and authentication server 101 and asks for authentication (510). The device management and authentication server 101 checks the received user authentication information against the user information database for authentication and returns the result to the blade server 106. At this stage, authentication is performed to see whether or not the user has permission for accessing the blade server 106 itself.

If the blade server 106 receives a reply from the device management and authentication server 101 that authentication has successfully completed, the blade server 106 judges that the accessing user has been permitted to use the blade server 106 and determines which PC the user should use among the constituent PCs of the blade server 106. The PC may be assigned in any one of the following ways: the PC is appropriately assigned in order of usage, the PC is preassigned in one PC to one user relationship, or the PC is assigned in accordance with some rights granted to the user. The administrator determines which way to use. The following description will be provided with respect to the case where the blade server 106 assigns the PC-A 110 to the accessing user. The same process applies to other cases where other PC is assigned.

After the blade server 106 has determined the PC-A 110 to be assigned to the PC-D 113, the blade server 106 checks the startup status of the PC-A 110 (511). If the PC-A 110 has not started up, a request will be made to the PC-A 110 to start up (512). Upon startup in response to the transmitted request (513), the PC-A 110 notifies the blade server 106 of the information indicating that the startup has completed (514). If the PC-A 110 has already started up, for example, if the PC-A 110 has a server function by which multiple users can simultaneously use the PC-A 110, and therefore is always on, the startup operations of the PC starting from step 511 are not required.

The operational status of the PC is available by accessing the PC usage management table 400 and checking the status 410 for the relevant PC name 401. Upon startup, the assigned client apparatus is added in the PC usage management table 400 as the source terminal 405 for the relevant PC name 401.

On the other hand, after the PC-A 110 has started up, the virtual device manager 120 installed on the PC-A 110 checks available devices (515). Specifically, the virtual device manager 120 sends device management and authentication server 101 a request for surveying devices (hereinafter referred to as "available device survey request") available to the PC on which the virtual device manager 120 is running (PC-A 110 in the present example) (516).

Upon receipt of the available device survey request, the device management and authentication server 101 surveys and checks the devices (517). Specifically, the device management and authentication server 101 that received the available device survey request first checks whether or not a new device has been newly registered, and updates the device information table 200 that the device management and authentication server 101 has already held (518). In response to the available device survey request, the device management and authentication server 101 interrogates, for each device currently registered in the device information table 200, the device management manager of each client apparatus such as a PC or hub to which each device is coupled whether or not each registered device is still available (519).

The device management manager of each client apparatus that has been interrogated by the device management and authentication server 101 returns the current availability of the interrogated device to the device management and authentication server 101 (520). Each device management manager returns the current status, as the information indicative of the availability, indicating that the device is discoupled if it has already been discoupled, or that the device is "exclusively in use", "in use", or "in communication" if the device is coupled. The device management and authentication server 101 uses the information received from each of the device management managers to update the device information table 200. When received the information that the device is discoupled, the device management and authentication server 101 deletes the record for the device.

Then, the device management and authentication server 101 sends a device registered in the device information table 200 as a currently available device to the interrogating virtual device manager 120 (521).

Next, the virtual device manager 120 performs the device sharing process based on the information of the device information table 200. Since the virtual device manager 120 has not authenticated the user at this point of time, the virtual device manager 120 cannot perform the device sharing process for the device whose usage is limited to a usage permitted ID in the device information table when checking an available device. Therefore, the virtual device manager 120 extracts a device that has been registered in the device information table 200 and whose usage permitted ID 211 is not defined, and prepares the communication with the device, for example, by creating channels to the device (522, 523).

The device management and authentication server 101 may also be configured such that when received the available device survey request from the virtual device manager 120 (516), the device management and authentication server 101 will not interrogate each device management manager 123, but instead extract a device that has been registered in the device information table 200 at that point of time and whose usage permitted ID 211 is not defined, and reply to the interrogating virtual device manager 120 (521). In this case, steps 517 to 520 are not executed.

The channel is created in such a way that the virtual device manager 120 performs mutual authentication, key exchange, and creates an encrypted communication channel to the device management manager on the client apparatus to which each device received as an available device at step 521 is coupled, based on the IP addresses of both managers and the information obtained from the device management and authentication server 101 (523).

The mutual authentication, as one example, is performed in such a way that the device management and authentication server 101 sends a pre-shared key in a safe manner to the device management manager 123 when the device information is sent and received therebetween, and to the virtual device manager 120 when the device for use is returned, and performs authentication based on the pre-shared key. The mutual authentication method is not limited to this, but may be other methods in which the device management and authentication server 101 can verify that it creates a channel for specific device management manager and virtual device manager.

Upon completion of the mutual authentication, encrypting keys are exchanged for communicating ID information and data between the virtual device manager 120 and device management manager. The encrypting keys exchanged at this point are used for subsequent communication between the device management manager and virtual device manager 120. Thus, a third party cannot illegally intercept the communication of the ID information and data. The encrypting key may be a fixed value, or may be arranged such that each key is discarded after one use or in a predetermined period and a new encrypting key is created.

In the present embodiment, when the channel has been created between the virtual device manager 120 and device management manager 123, we refer to the state that the device managed by the management manager 123 becomes a sharable device. Such a communication path (channel) that a third party can not intercept allows the PC-A 110 to control the device A 151 as in the case where the device A 151 is directly coupled to the PC-A 110.

In other words, "device sharing" in the present embodiment means that the PC-A 110 operates in such a way that the PC-A 110 can perform processes as in the case where the device A 151 is directly coupled to the PC-A 110. For example, when "device sharing" is realized in the device A 151 coupled to the PC-D 113, the PC-A 110 can read or reset the communication scheme or descriptors set in the device A 151 through the device management manager 123 and virtual device manager 120.

If the PC-A 110 has not used the device A 151 in the past, necessary device drivers are installed. In general, when a device is shared, the OS running on the PC-A 110 automatically recognizes the newly added device and installs device drivers necessary for the operation of the device. Such installation occurs when a device to be used with the PC-A 110 for the first time is shared between the PC-A 110 and other instruments. If the device has been used with the PC-A 110 in the past, necessary drivers have already been installed in the PC-A 110 and such installation does not occur.

If the OS running on the PC-A 110 does not have the above mentioned function by which a device is automatically recognized and necessary device drivers are installed, the administrator or user manually installs the device drivers and changes the setting of the PC-A 110 to make the device available.

When multiple users share the device A 151, each of the users may send a reset instruction or perform communication independent of each other. In such a situation, the device management manager 123 is configured such that it changes the procedure not so as to accept a reset instruction, or it instead sends information that has already been acquired from the device A 151 and stored in the device management manager 123. Specifically, the device management manager 123 responds in a predefined manner to a specific communication from the virtual device manager 120.

The information on the channel created at this stage is sent to the device management and authentication server 101 (591), which uses the received information to update the device information table 200 (592).

With the above processes, the PC-A 110 becomes available to the user of the PC-D 113.

Next, the user requests to use the PC-A 110 through the PC-D 113. That is, when received the instruction from the user indicating that the user would use the PC-A 110, the PC-D 113 creates a request for using the PC (hereinafter referred to as "PC usage request") and sends it to the PC-A 110 (524). This PC usage request includes information identifying the user, for example, the user ID and password.

The PC-A 110 receives the PC usage request and performs a login operation (525). In the login operation, the PC-A 110 first sends information identifying the user included in the PC usage request to the device management and authentication server 101. The device management and authentication server 101 compares the received information identifying the user with the information stored in the user information database 300, authenticates the user, and returns the result to the PC-A 110. The PC-A 110 may also be configured to hold in advance, among the items in the user information database 300, only necessary items for identifying the user at the time of login and perform authentication at the time of login in the PC-A 110.

Next, the virtual device manager 120 checks available devices. At this stage, the virtual device manager 120 extracts devices available to the logged-in user. The procedure for extracting available devices is basically similar to that described above at step 516. The ID of the logged-in user may also be sent to the device management and authentication server 101 at the time of the request, and the device management and authentication server 101 may return only the devices registered as having the ID of the user as the usage permitted ID.

As in the processes above, the device management and authentication server 101, for each device registered in the device information table 200, interrogates the device management manager of the client apparatus to which each device is coupled about latest information, receives a reply, updates the device information table 200, and send a reply to the interrogating virtual device manager 120 (529 to 532). As in the above description, the device management and authentication server 101 may also be configured to respond to the available device survey request, refer to the device information table 200, and return the devices currently registered as available to the user to the interrogating virtual device manager 120 (532).

In the first available device checking (516 to 521), since the user was not identified, the sharing process could not be performed, i.e., the communication path could not be established for the devices whose usage was limited to the usage permitted IDs. However, after the user logged in (525), the devices whose usage permitted IDs include the ID of the user or the group to which the user belongs become available. Therefore, as in the description above, a communication path (channel) is established for the new device that has become useable at this point of time (533 to 534).

A configuration is also possible in which in the preparatory stage for communicating with the available devices (533), a list of available devices is displayed on the screen of the PC-A 110 or PC-D 113, or a screen that the administrator in the information center 102 can recognize. In this case, a list of the currently shared devices, connectable devices, and the like will be displayed on these screens. For the devices that were in the shared device list at the last usage completion time held by the virtual device manager 120 and that are currently available, it is possible to create a channel, i.e., share the devices without any user instructions. A configuration is possible in which the administrator or user can specify whether the sharing setting for a sharable device is specified with or without user instructions.

The information on the created channel is sent to the device management and authentication server 101 (593). The device management and authentication server 101 updates the device information table 200 based on the received information on the channel (594). Then, the use of the PC-A 110 is initiated (535).

Thus, the device information table held by the device management and authentication server 101 keeps being updated to the latest all the time by repeating available device checking, available device survey request, survey and check of devices, device availability interrogation, device information acquisition, device information transmission/available device reply (526 to 534), channel creation information transmission 593, and table update 594 during the use of the PC (535) as appropriate.

The available device checking by the virtual device manager 120 after the user logged in is desirably performed on a regular basis. The virtual device manager 120 regularly checks the device information table 200 to check whether status changes have changed the device sharability.

On the other hand, whenever the states of the devices change, for example, when the state of device connection changes, when the status changes, and the like, the device management manager 123 notifies the device management and authentication server 101 to update the device information table 200 to reflect the information indicative of the states after the changes.

The device management manager 123 and virtual device manager 120 operate and communicate with each other through the above processes, allowing the device A 151 to operate as the device of the PC-A 110. That is, device sharing is realized for the device A 151.

Figure 7:
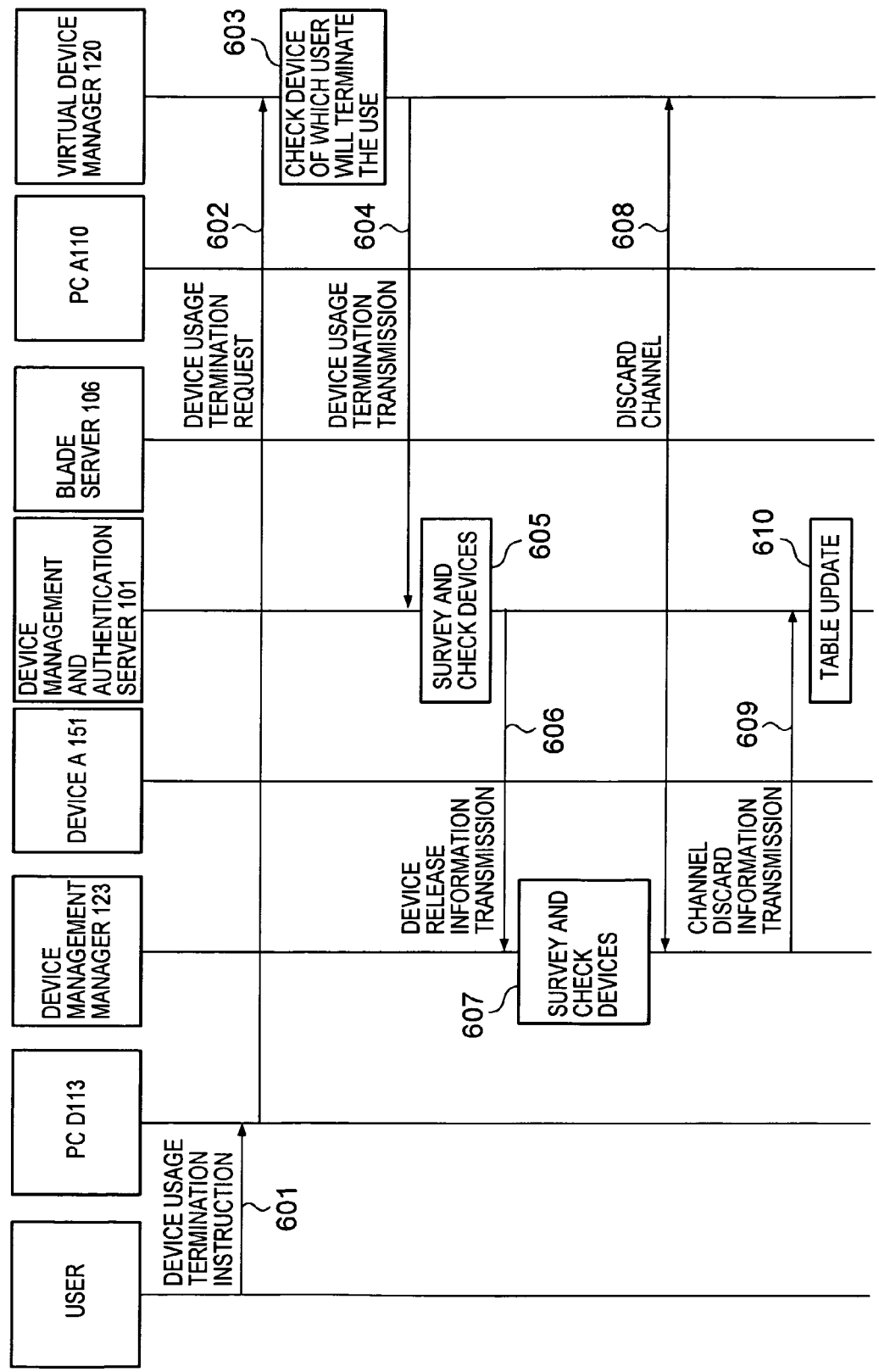
FIG. 7 is the process flow diagram when terminating the device sharing process of the first embodiment.

The processes at the completion of device sharing in the device management system according to the present embodiment will be described. FIG. 7 is a process flow diagram at the completion of device sharing according to the present embodiment.

As shown in the figure, the user uses the PC-D 113 to remotely operate the PC-A 110, terminates the use of the device A 151, and releases the device A 151 to other users.

The user instructs the PC-D 113 to terminate the use of the device (601). When the user instructs the PC-D 113 to terminate the use of the device, the PC-D 113 sends a request for terminating the use of the device (hereinafter referred to as "device usage termination request") to the virtual device manager 120 (602). Upon receipt of the device usage termination request, the virtual device manager 120 checks the device of which the user will terminate the use (603). Specifically, the virtual device manager 120 judges whether the use of the device at the PC-A 110 may be terminated.

For example, if an application running on the PC-A 110 or any other client apparatus is using the device to which a usage termination request is made, the use of the device cannot be terminated. In this case, the completion process should wait until the application or other client apparatus terminates the use of the device to which a usage completion request is made. In this case, the PC-D 113 is notified that its instruction to terminate the device cannot be carried out. The PC-D 113 notifies the user of the received notification by means of display or the like.

This notification is not necessarily made. Instead, the notification may be made only when the usage is not terminated even after a predetermined wait. If the usage can be terminated when checking the device of which the user will terminate the use (603), device usage termination transmission, which is notification that the device has been terminated, along with the information identifying the device is made to the device management and authentication server 101 (604).

Next, the device management and authentication server 101 checks and verifies the device in response to the device usage termination transmission (605). Specifically, device release information transmission indicating that the use of the specified device has been terminated is made to the device management manager 123 which has requested to terminate the use of the device (606).

The device management manager 123 checks and verifies the device (607). At this stage, the checking includes examining whether or not there is a response from the device. If not, the status of the relevant device in the device information table 200 is set to "unknown".

On the other hand, if a normal response is returned from the device, the device management manager 123 discards the channel established to the virtual device manager 120 (608). If the channel has been successfully discarded, the device management manager 123 sends the device management and authentication server 101 channel discard information indicating that the channel has been discarded (609).

Upon receipt of the channel discard information, the device management and authentication server 101 updates the device information table 200 (610). That is, for the device whose channel has been discarded at this point of time, the device management and authentication server 101 changes the status 210 in the device information table 200, for example, from "exclusively in use", "in use", "in communication", or the like to "not in use".

The device management and authentication server 101, device management manager 123, and virtual device manager 120 record the data sent or received in the sequence of operations described with reference to FIGS. 6 and 7 on the storage units 190, 163, and 160 as logs 191, 173, and 170 respectively.

The control over sending and receiving data between the device management manager 123 and virtual device manager 120 after the processes in FIG. 6 have completed and the device A 151 has become sharable and operatable as a device of the PC-A 110 will be described in detail.

Figure 8:
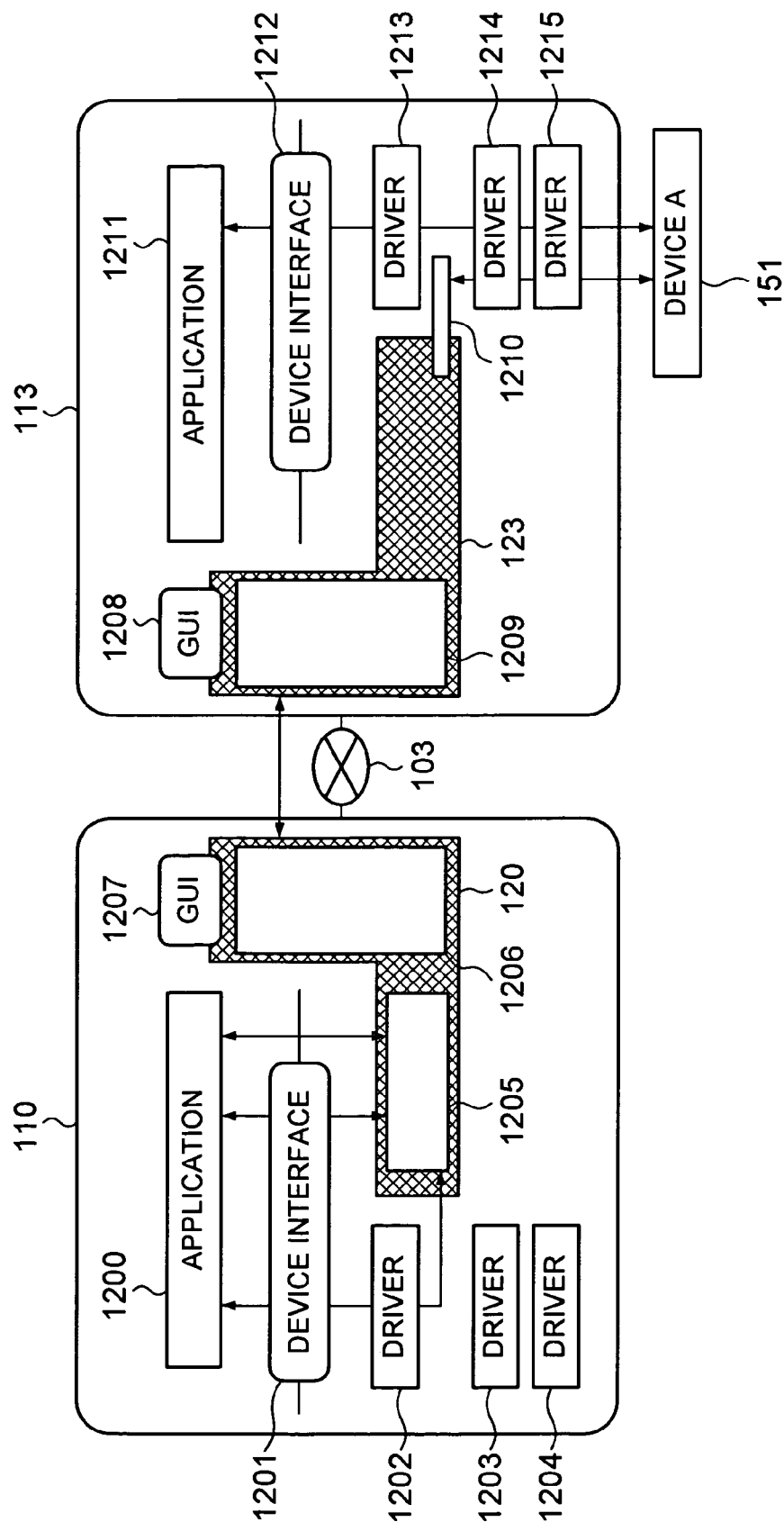
FIG. 8 is a view for explaining the operations of the device management manager and virtual device manager of the first embodiment.

FIG. 8 is a view for explaining the relationship of the device management manager 123 and virtual device manager 120 vs. device drivers and applications of the PC-A 110 and PC-D 113 (software stack).

When the application 1211 running on the PC-D 113 operates the device A 151 coupled to the PC-D 113 and sends/receives commands, it is usually necessary to go through a plurality of drivers 1213 to 1215 via a device driver interface 1212. In this example, the drivers 1213 and 1214 are, for example, drivers of the connection interface to which the device A 151 coupled. The driver 1213 is the uppermost driver, and the drivers 1214 and 1215 are lower drivers in this order for the device.

The device management manager 123 has a filter driver 1210. The filter driver 1210 operates as an upper filter driver or lower filter driver of the drivers 1213 to 1215, and sends and receives data to and from the device A 151 through the paths indicated by the arrows using the drivers 1213 to 1215. That is, the filter driver 1210 sends and receives data to and from the device A 151 via the drivers 1215 and 1214.

Although the filter driver 1210 is described as a filter driver, it may have some or all of the functions of the drivers 1213 to 1215, in which case the filter driver 1210 acts as a kind of a device driver.

The device management manager 123 and the virtual device manager 120 communicate with each other by sending and receiving data between a communication module 1209 of the device management manager 123 and a communication module 1206 of the virtual device manager 120 over the network 103.

The virtual device manager 120 has a device driver 1205, which exchanges information when sending and receiving data between the application 1200 or the like running on the PC-A 110 and the device A 151.

Sending and receiving data between the application 1200 and the device driver 1205 is performed directly from the application 1200, through a device driver interface 1201, or through drivers 1202 to 1204, as indicated by the arrow.

GUIs 1207 and 1208 are graphical user interfaces of the virtual device manager 120 and device management manager 123 respectively, and serve to provide information to the user or receive information input from the user.

As described above, the virtual device manager 120 is an entrance when the application on the PC-A 110 sends and receives data to and from a device that resides in the device management system of the present embodiment. The virtual device manager 120 has the device driver 1205 and communication module 1206 therein, which provide a function of communicating with the device management manager 123 and device management and authentication server 101 over the network 103.

The device management manager 123 is an entrance when the device A 151 coupled to the PC-D 113 sends and receives data to and from a PC or the like that resides in the device management system of the present embodiment. The device management manager 123 has the filter driver 1210 and communication module 1209 therein, which provide a function to communicating with the virtual device manager 120 and device management and authentication server 101 via the network 103.

Figure 9:
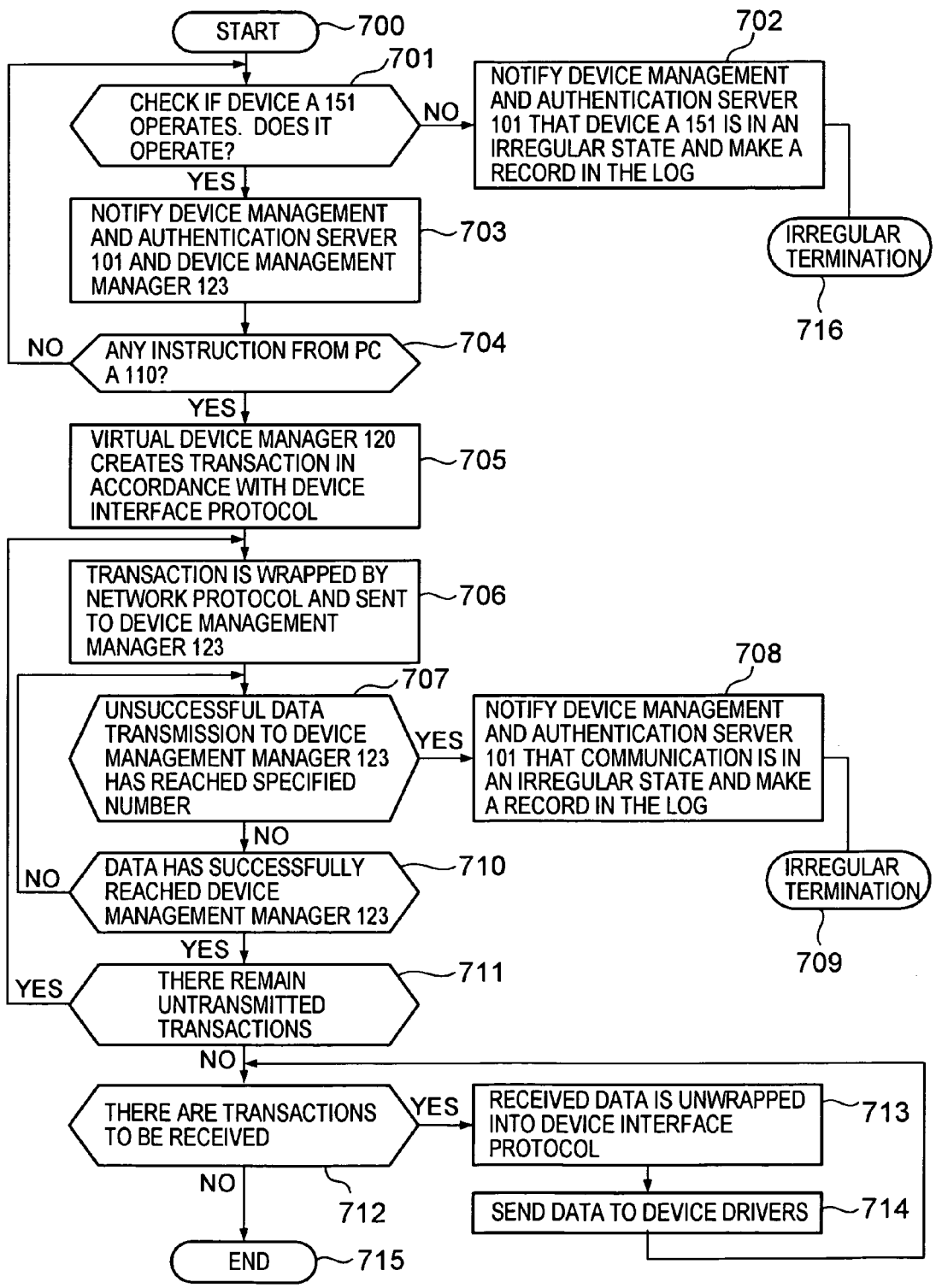
FIG. 9 is a flow diagram for explaining the operations for using a device according to the first embodiment.

The operations will be described when an instruction to use the device A 151 is provided to the virtual device manager 120 after the channel creation shown in FIG. 6 (523 and 534) has completed and the device A 151 has been controllable from the virtual device manager 120. FIG. 9 is a process flow diagram for explaining the operations of the device management manager 123 and virtual device manager 120 when using a device in the device management system of the present embodiment. The process will be described for the case where the virtual device manager 120 triggers the operations.

After the channel creation shown in FIG. 6 (523 and 534) has completed and the device A 151 has been controllable from the virtual device manager 120, and when the instruction to use the device A 151 is provided to the virtual device manager 120 (start 700), the virtual device manager 120 checks if the device A 151 operates (701). Specifically, the virtual device manager 120 sends a predetermined command to the device management manager 123 and interrogates whether or not the status of the device A 151 can be obtained, and whether the device A 151 can communicate. Alternatively, the virtual device manager 120 checks if a communication path has been established. Then, the virtual device manager 120 will make a judgment based on a reply from the device management manager 123.

If the device A 151 is not in operation, the device management and authentication server 101 is notified that the device A 151 is in an irregular state, and the authentication server 101 and virtual device manager 120 make a record in the logs 191 and 170 respectively (702). After the log 170 is recorded, the virtual device manager 120 irregularly terminates the process for the given instruction (716). At the time, the virtual device manager 120 may notify the user with an error message indicative of the irregular termination. Furthermore, the virtual device manager 120 may be configured to automatically perform a process for terminating the communication with the device A 151 after notified that the device A 151 is in an irregular state. The virtual device manager 120 may also be configured to repeat the operation check attempt multiple times and proceed to 702 if these attempts keep notifying that the device A 151 is in an irregular state.

On the other hand, when the device A 151 is determined to be in operation at step 701, the virtual device manager 120 notifies the device management and authentication server 101 and device management manager 123 as required to confirm that the device A 151 is alive (703). This process allows the device management and authentication server 101 and device management manager 123 to confirm that a channel to the device A 151 has been established.

Next, the virtual device manager 120 judges whether or not it has received an instruction that becomes a trigger to use the device A 151 (from the PC-A 110, for example) (704). If it is determined that there is no instruction that becomes the trigger, the process returns to step 701.

On the other hand, if it is determined that there is an instruction that becomes the trigger, the virtual device manager 120 creates a transaction in accordance with a device interface protocol (705). Then, the created transaction is converted into the protocol defined in the network protocol and sent to the device management manager 123 (706).

Next, the virtual device manager 120 judges whether the transaction (data) has successfully reached the device management manager 123. If not, the virtual device manager 120 judges whether the number of attempts has exceeded a pre-specified number.

Specifically, the virtual device manager 120 first judges whether or not the number of unsuccessful data transmission to the device management manager 123 has reached the specified number (707).

If it has reached the specified number, the virtual device manager 120 judges that the communication is in an irregular state, notifies the device management and authentication server 101 accordingly, and makes a record in the log 170 (708). The device management and authentication server 101 may be configured to record the information indicative of the irregular communication in the log 191 as well. After the log 170 is recorded, the virtual device manager 120 irregularly terminates the process (709). The virtual device manager 120 may notify the user of the error, or may automatically proceed to a process for terminating the communication with the device A 151.

On the other hand, if the number has not reached the specified number at step 707, the virtual device manager 120 checks whether or not the data has successfully reached the device management manager 123 (710). Specifically, it is determined that the data has not successfully reached if the data transmission was determined to be irregular by the response for the data sent, or if no response is returned in a predetermined time period. If it is determined that the data has not successfully reached, the number of unsuccessful transmission is incremented by one and the process returns to step 707.

If the data has successfully reached at step 710, the virtual device manager 120 checks whether or not there remain untransmitted transactions (711). If there remain untransmitted transactions, the process returns to step 706 to be repeated.

If there is no untransmitted transaction, the virtual device manager 120 checks whether or not there are transactions to be received (712). The virtual device manager 120 judges it based on whether or not the amount of data pre-specified when the communication path was established between the virtual device manager 120 and the device management manager 123 has been transmitted.

If there are transactions to be received, the virtual device manager 120 converts the received data into the device interface protocol (713). Then, the extracted data is sent to the device drivers (714) and the process returns to step 712.

On the other hand, if there is no transaction to be received at step 712, the virtual device manager 120 ends the process (715).

If the process is irregularly terminated in the above process (step 716 or 709), the device management and authentication server 101, device management manager 123, and virtual device manager 120 check again which device can be appropriately used when the process is irregularly terminated, and update the device management table 200 in the device management and authentication server 101. That is, if succeeded in the rechecking, the virtual device manager 120 again performs normal communication and creates a channel if possible, and sets the status in the device management table 200 to "exclusively in use", "in communication", or "in use".

Figure 10:
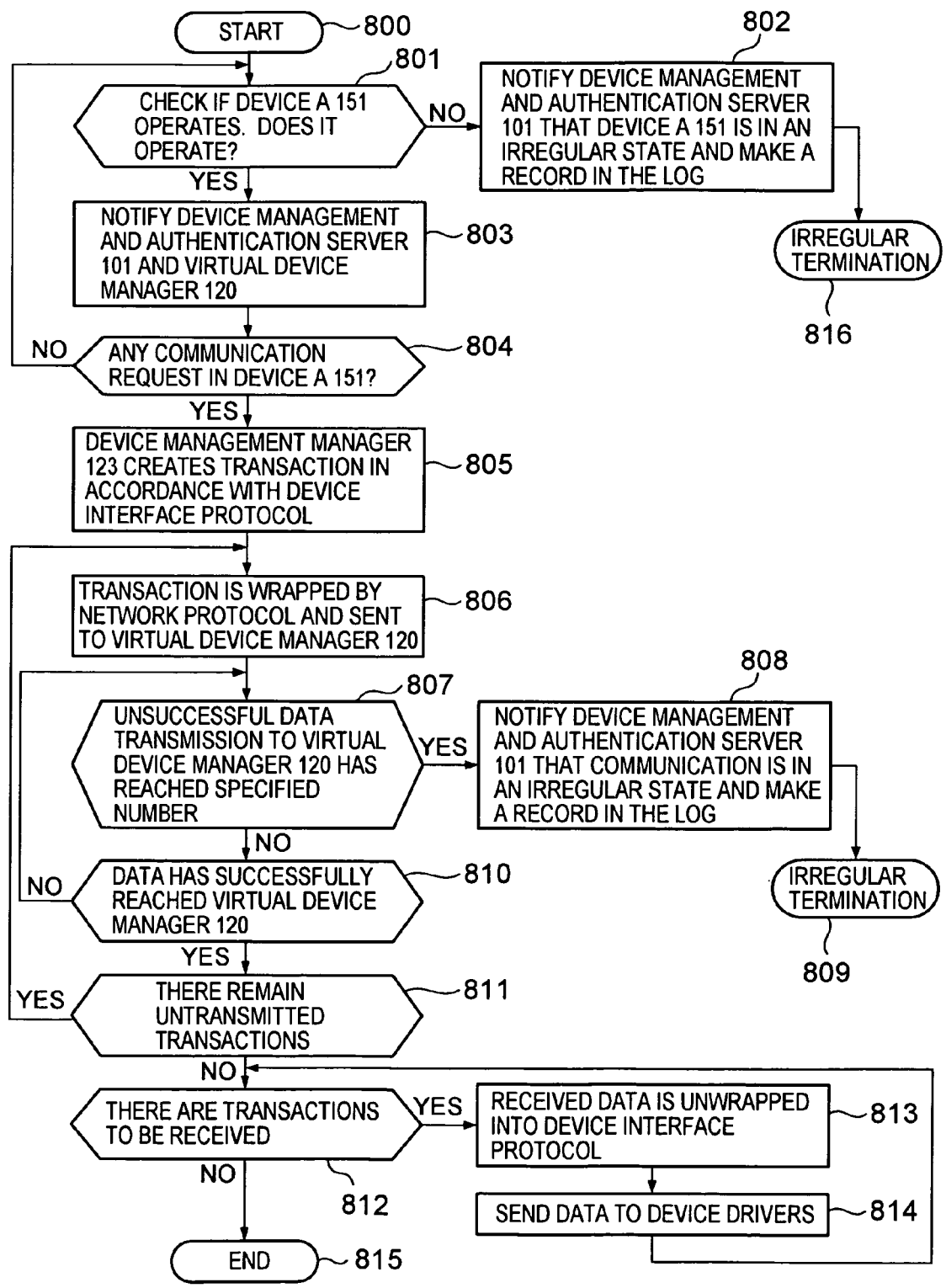
FIG. 10 is a flow diagram for explaining the operations for using a device according to the first embodiment.

The operations will be described when the device A 151 sends information to the device management manager 123 after the channel creation shown in FIG. 6 (523 and 534) has completed and the device A 151 has been controllable from the device management manager 123. FIG. 10 is a process flow diagram for explaining the operations of the device management manager 123 and virtual device manager 120 when using a device in the device management system of the present embodiment. The process will be described for the case where the device A 151 triggers the operations.

After the channel creation shown in FIG. 6 (523 and 534) has completed and the device A 151 has been controllable from the device management manager 123, and when the device A 151 sends the information to the device management manager 123 (start 800), the device management manager 123 checks if the device A 151 operates (801). This operation check is similar to the process of FIG. 9.

If the device A 151 is not in operation, the device management and authentication server 101 is notified that the device A 151 is in an irregular state, and the authentication server 101 and device management manager 123 make a record in the logs 191 and 173 respectively (802). After the log 173 is recorded, the device management manager 123 irregularly terminates the process (816). At the time, the device management manager 123 may notify the user with an error message indicative of the irregular termination. Furthermore, the device management manager 123 may be configured to automatically perform a process for terminating the communication with the device A 151 after notified that the device A 151 is in an irregular state. The device management manager 123 may also be configured to repeat the operation check attempt multiple times and proceed to 802 if these attempts keep notifying that the device A 151 is in an irregular state.

On the other hand, when the device A 151 is determined to be in operation at step 801, the device management manager 123 notifies the device management and authentication server 101 and virtual device manager 120 as required to confirm that the device A 151 is alive (803). This process allows the device management and authentication server 101 and virtual device manager 120 to confirm that a channel to the device A 151 has been established.

Next, the device management manager 123 judges whether or not it has received an instruction that becomes a trigger to use the device A 151 (from the PC-A 110, for example) (804). If it is determined that there is no instruction that becomes the trigger, the process returns to step 801.

On the other hand, if it is determined that there is an instruction that becomes the trigger, the device management manager 123 creates a transaction in accordance with the device interface protocol (805). Then, the created transaction is converted into a packet defined in the network protocol and sent to the virtual device manager 120 (806).

Next, the device management manager 123 judges whether the transaction (data) has successfully reached the virtual device manager 120. If not, the device management manager 123 judges whether the number of attempts has exceeded a pre-specified number.

Specifically, the device management manager 123 first judges whether or not the number of unsuccessful data transmission to the virtual device manager 120 has reached the specified number (807).

If it has reached the specified number, the device management manager 123 judges that the communication is in an irregular state, notifies the device management and authentication server 101 accordingly, and makes a record in the log 173 (808). The device management and authentication server 101 may be configured to record the information indicative of the irregular communication in the log 191 as well. After the log 173 is recorded, the device management manager 123 irregularly terminates the process (809). The device management manager 123 may notify the user of the error, or may automatically proceed to a process for terminating the communication with the device A 151.

On the other hand, if the number has not reached the specified number at step 807, the device management manager 123 checks whether or not the data has successfully reached the virtual device manager 120 (810). If it is determined that the data has not successfully reached, the number of unsuccessful transmission is incremented by one and the process returns to step 807.

If the data has successfully reached at step 810, the device management manager 123 checks whether or not there remain untransmitted transactions (811). If there remain untransmitted transactions, the process returns to step 806 to be repeated.

If there remains no untransmitted transaction, the device management manager 123 checks whether or not there are transactions to be received (812).

If there are transactions to be received, the device management manager 123 converts the received data into the device interface protocol (813). Then, the extracted data is sent to the device drivers (814) and the process returns to the step 812.

On the other hand, if there is no transaction to be received at step 812, the device management manager 123 ends the process (815).

If the process is irregularly terminated in the above process (step 816 or 809), the device management and authentication server 101, device management manager 123, and virtual device manager 120 check again which device can be appropriately used when the process is irregularly terminated, and update the device management table 200 in the device management and authentication server 101. That is, if succeeded in rechecking, the device management manager 123 again performs normal communication and creates a channel if possible, and sets the status in the device management table 200 to "exclusively in use", "in communication", or "in use".

The logs 191, 170, and 173 accumulated by the device management and authentication server 101, virtual device manager 120, and device management manager 123 in the above operations are displayed by the management application installed on the device management and authentication server 101 or other management instruments by the network administrator.

FIG. 11 shows one example of a log management view displayed by the management application. The management logs shown in this figure show the logs that the device management and authentication server 101 has collected and accumulated in its storage unit 190 or memory from the logs 191, 170, and 173 that the device management and authentication server 101, virtual device manager 120, and device management manager 123 have saved.

The display application (management application) may reside elsewhere other than in the device management and authentication server 101. In this case, the display is carried out upon permission from the device management and authentication server 101. In a configuration in which a plurality of information centers 102 and blade servers 106 exist, the management application may collect logs from a device management and authentication server different from the device management and authentication server 101 and applications under the control of that device management and authentication server, and display the collected logs together.

The device management view 1000 is for managing the devices that the management application displays. The device management view 1000 displays the following items for each of the accumulated logs 191, 170, and 173: the number 1001, time 1002, device ID 1003, device name 1004, address (source) 1005, network interface ID (source) 1006, application ID 1007, address (host) 1008, network interface ID (host) 1009, application ID 1010, vendor ID 1011, product ID 1012, serial number 1013, device name 1014, user ID 1015, information 1016, and remarks 1017.

The number 1001 is for managing a log and automatically assigned whenever a log is stored. The time 1002 is the date and time when the log is recorded. The information 1016 displays in detail the contents of the events recorded as logs in the logs 170, 173, and 191.

The address (source) 1005 and address (host) 1008 indicate the addresses of the source and host (destination). The network interface ID (source) 1006 and network interface ID (host) 1009 indicate the network interface IDs of the source and host (destination). The remarks 1017 displays information that overflows the field of the information 1016, such as information calling administrator's attention or information supplementing the information 1016.

The other items are the same as those that bear the same names in the device information table 200, user information database 300, PC usage management table 400 described with reference to the FIGS. 2 to 4.

Furthermore, the device management and authentication server 101 is provided with a management application that has a function to search each piece of the information displayed on the device management view 1000. This management application displays the information shown on the device management view 1000 to instantly inform the state of an instrument or device, providing increased convenience of the overall system. For example, by searching, displaying, and monitoring only the information on unauthorized authentication, it is possible to find an unauthorized access and take action therefor. Furthermore, by searching, displaying, and monitoring only the information on the device that cannot be appropriately used, it is possible to troubleshoot a problem in the system at an early stage and take action therefor. Moreover, the management application can provide more clarity compared to the entire log listing to reduce operational mistakes the administrator may make. These provide an advantage of increased security for the overall system.

Figure 12:
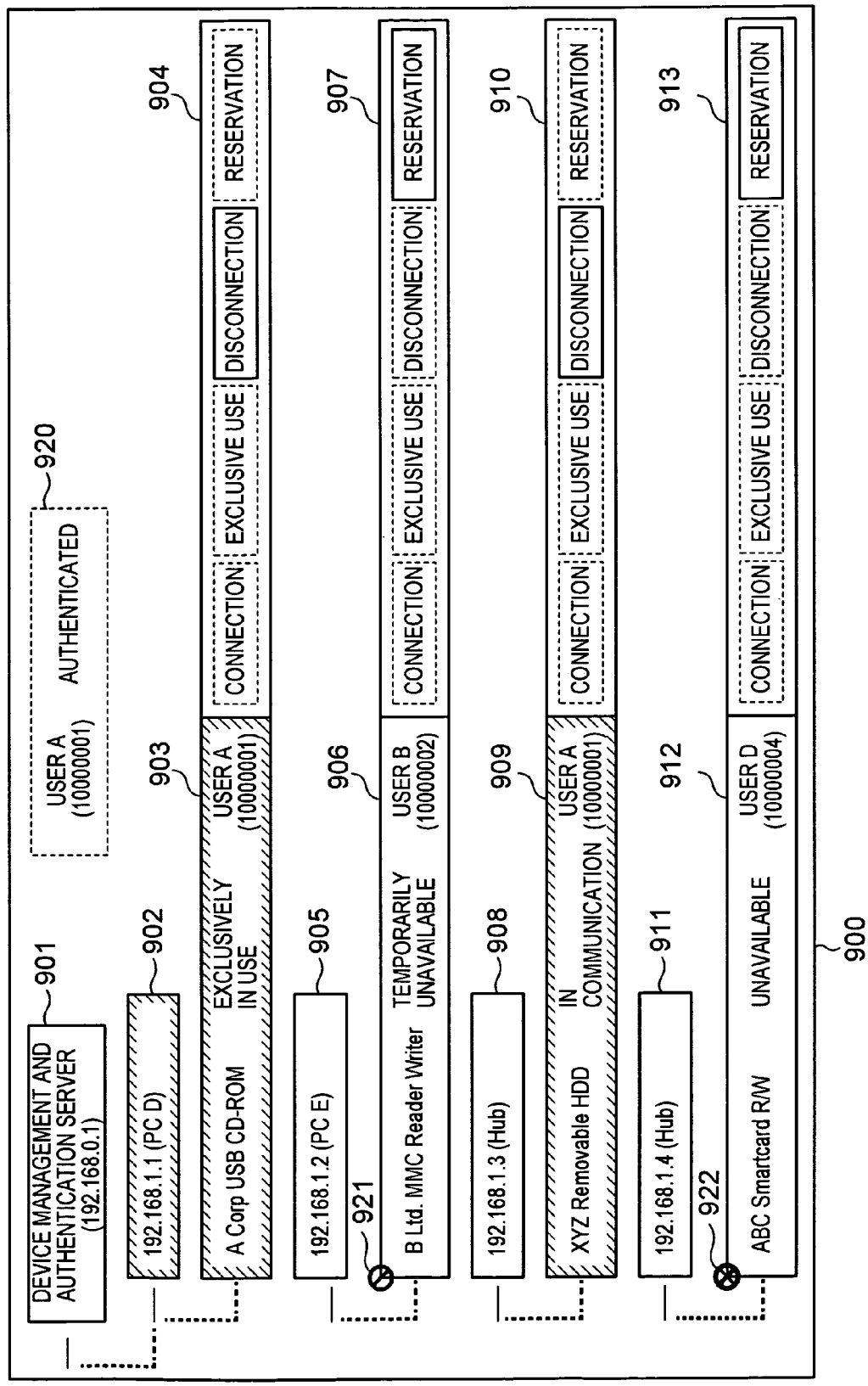
FIG. 12 is one example of the device management view of the virtual device manager of the first embodiment.

The device management view that the virtual device manager 120 creates and displays will be described in detail. FIG. 12 is one example of the device management view of the virtual device manager 120.

As shown in the figure, the device management view 900 includes the device management and authentication server display section 901, coupled PC or hub display sections 902, 905, 908, and 911, device display sections 903, 906, 909, and 912, and connection/disconnection instruction sections 904, 907, 910, and 913.

Upon startup, the virtual device manager 120 sends a request for acquiring available device information to the pre-specified device management and authentication server 101.

After successful user authentication in the device management and authentication server 101, the device management information is sent from the device management manager 123 to the virtual device manager 120. Based on the received device management information, the virtual device manager 120 manages available device information and the like.

In the device management and authentication server display section 901 in FIG. 12, the device management and authentication server 101 in communication with the virtual device manager 120 is displayed. The example shown in FIG. 12 displays that the virtual device manager 120 is successfully in communication with the device management and authentication server 101. In this example, the displayed "192.168.0.1" is the address of the device management and authentication server 101.

The status 920 displays the status of the device management and authentication server 101. In this example, displayed status includes the usage permitted user ID, user name, and the like. The example of FIG. 12 displays that the user A has been authenticated.

The coupled PC or hub display sections 902, 905, 908, and 911 display the information on the coupled PCs and hubs. They also display the devices currently used by users in respective colors.

The device display sections 903, 906, 909, and 912 display the information, such as the device names and their statuses, and user IDs so as to display which device is available to users in an easily understandable manner.

The connection/disconnection instruction sections 904, 907, 910, and 913 display choices by which the user can provide his/her instruction, such as use, exclusive use, usage termination, or reservation of the device. The virtual device manager 120 accepts the push of the reservation button and makes a usage reservation of the device currently in use by other user. Then, the virtual device manager 120 notifies, when the device becomes available, the device management and authentication server 101 or device management manager 123 that the device becomes available. The device management manager 123 that received the notification notifies the user that the device becomes available. In the example of FIG. 12, devices available to users are shown as hatched and operations that users can carry out are shown with boldface buttons for user-friendly operations.

The client/server architecture for using the PC-A 110 in the blade server 106 by using the PC-D 113 has been described above.

As in the example already described, it is possible to use any of the PCs in the blade server 106 or the devices A 151 to Z 155 from a client apparatus coupled to the network 103 and the Internet 104.

In this example, the hub 116 is a built-in instrument that does not have the functionality of a PC but has a management manager 126 and a storage unit 176 therein. When using a PC having no device coupled thereto like the PC-E 114, it is also possible to use devices coupled to other PCs as in the example of the PC-D 113. This also applies to the case where a plurality of devices is coupled like the hub 116.

The same also basically applies to the case where the PC-Z 117 that resides over the Internet 104 and the firewall 105 is used to use a PC or device on the network 103. In this case, however, the PC-Z 117 desirably has an encryption application 190 therein for encrypting the communication on the Internet 104, and performs encrypted communication.

As described above, with respect to managed devices, the device management system shown in the present embodiment manages a device coupled to the network 103 through a client apparatus by means of the virtual device manager 120, device management manager 123, and the device management and authentication server 101, providing safe and user-friendly device sharing in the system.

According to the present embodiment, even a device coupled to other client apparatus can be used as if it were directly coupled to the server. That is, even if the device is coupled to other client apparatus, each client apparatus is not required to be specially configured to use the device. Therefore, the system can be configured in the same manner both for the device virtually coupled to the server and for the device directly coupled to the server, allowing the manufacturing cost of the overall system to be reduced.

Furthermore, according to the present embodiment, the device management and authentication server 101 can manage the usage permission of a device, and set an unpermitted device unavailable as a virtual device. Thus, a device coupled to the network 103 can be appropriately managed, providing increased security in sharing the device with a remote server in a client/server system.

Moreover, by establishing a rule in which authentication is performed in a procedure to make a device sharable in order to determine whether or not the user can use the device, a safe and simple manner can be provided for sharing the device between a terminal, such as a PC or thin-client that the user operates at his/her site and a remote server, providing increased security and user convenience when using the system.

As mentioned above, the present embodiment is a client/server system configured such that a server stores main programs and data and a client, for the most part, only instructs the server to perform operations. Therefore, there can be provided an information processing system that provides increased security and convenience when using the client while keeping the feature of reduced secret information that remains in the client apparatus on the operation side.

Although the description has been made in the above embodiment, provided that information instruments, i.e., the server and client are both PCs, one or both of them may be servers, personal digital assistants (PDA), workstations, highly-sophisticate copy machine, automated teller machines (ATM), cellular phones, digital still cameras, music players (recorders), POS system, information terminals, transmitters for intelligent transport systems (ITS), ticket vending machines, settlement terminals, automatic vending machines, entrance/exit management apparatus, game consoles, pay phones, handhold order taking system, and the like. These also provide similar advantages.

Second Embodiment

A second embodiment according to the invention will be described. This embodiment is basically the same as the above first embodiment. Although in the first embodiment, the device is coupled to the network 103 via a PC, hub, or the like, in this embodiment, the device is directly coupled to the network 103. Thus, the device of this embodiment has a device management manager and the like therein.

Figure 13:
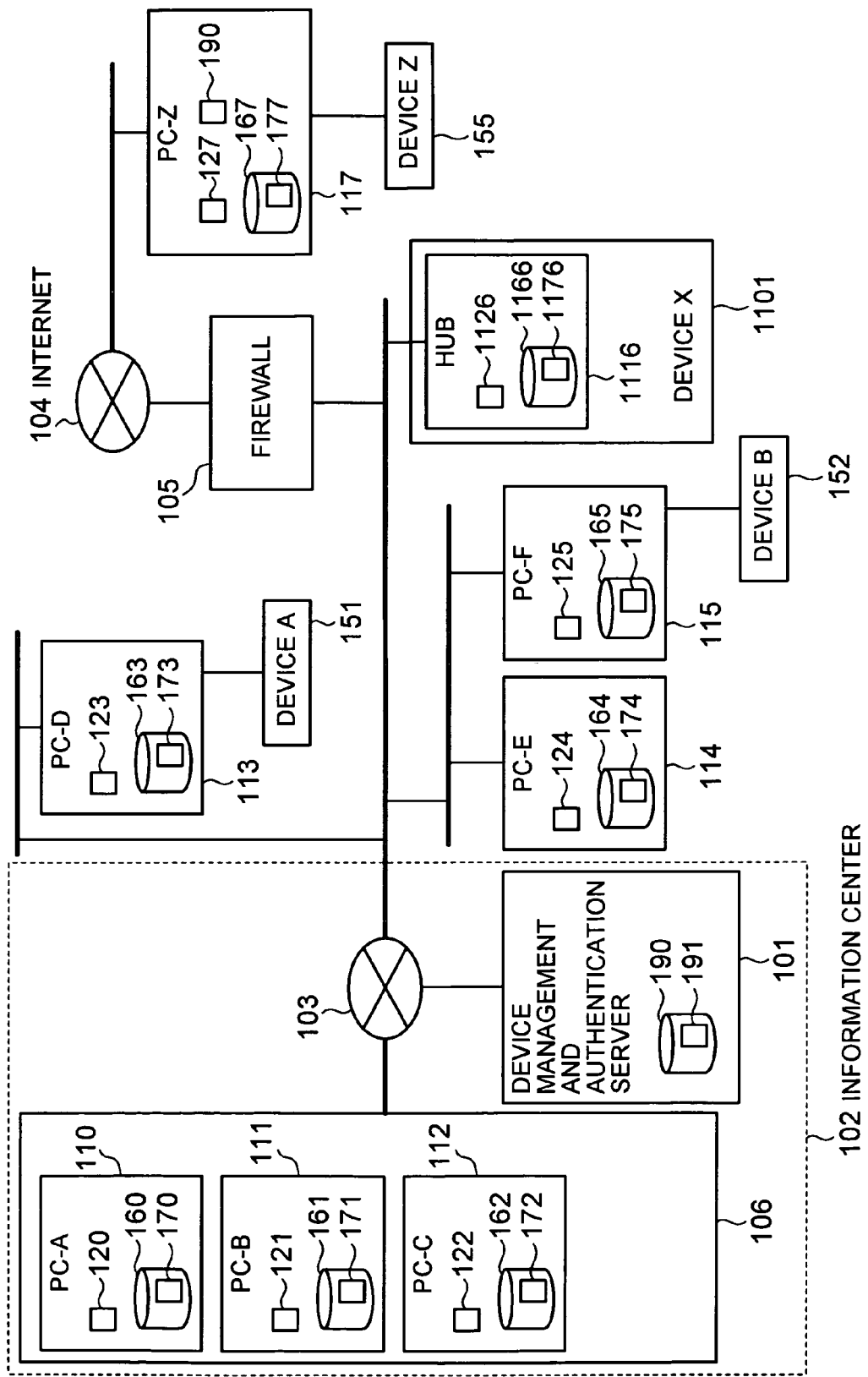
FIG. 13 is a block diagram of the device management system of the second embodiment.

FIG. 13 is a detailed block diagram of the device management system of the present embodiment. In this figure, instruments bearing the same names as those of the first embodiment shown in FIG. 1 have basically similar configurations. In the present embodiment, an additional device X 1101 is coupled to the network 103.

The device X 1101 is a peripheral instrument, for example, a storage device such as a CD-ROM drive, or a human interface device such as a keyboard and display. As shown in this figure, the device X 1101 of the present embodiment includes functions of the hub 116 of the first embodiment therein. That is, the device X 1101 includes a hub 1116 that is coupled to the network 103 through a network interface, not shown, and has a storage unit 1166 such as a hard disk drive or flash memory as well as a memory and CPU, not shown, to perform computing operations. The device X 1101 implements a device management manager 1126 in the hub 1116. The storage unit 1166 holds a log 1176.

Therefore, the user can use the device X 1101 of the present embodiment as a virtual device of a PC or the like in the blade server 106, as in the case of each of the devices of the first embodiment. Furthermore, like the hub 116 of the first embodiment, the device X 1101 is appropriately managed in the device management system by the device management manager 1126.

That is, the device management system shown in the present embodiment further provides convenience of direct connection of a device having functions of the hub 116, such as the device X 1101, to the network 103, in addition to the features of the device management system shown in the first embodiment.

With this convenience, the device management system shown in the present embodiment, in addition to the advantages of the device management system shown in the first embodiment, allows the use of the device X 1101 from a PC on the network by plugging the device X 1101 into the network 103 without being restricted to a specific hub or PC when the user connects the device, i.e., by directly connecting the device X 1101 to the interface of the network 103. A hub or PC to which the device is coupled is also not required. This arrangement therefore provides further increased user convenience, while maintaining high security. It also provides reduced system configuration cost.

Third Embodiment

A third embodiment according to the invention will be described. This embodiment is basically the same as the above second embodiment.

Figure 14:
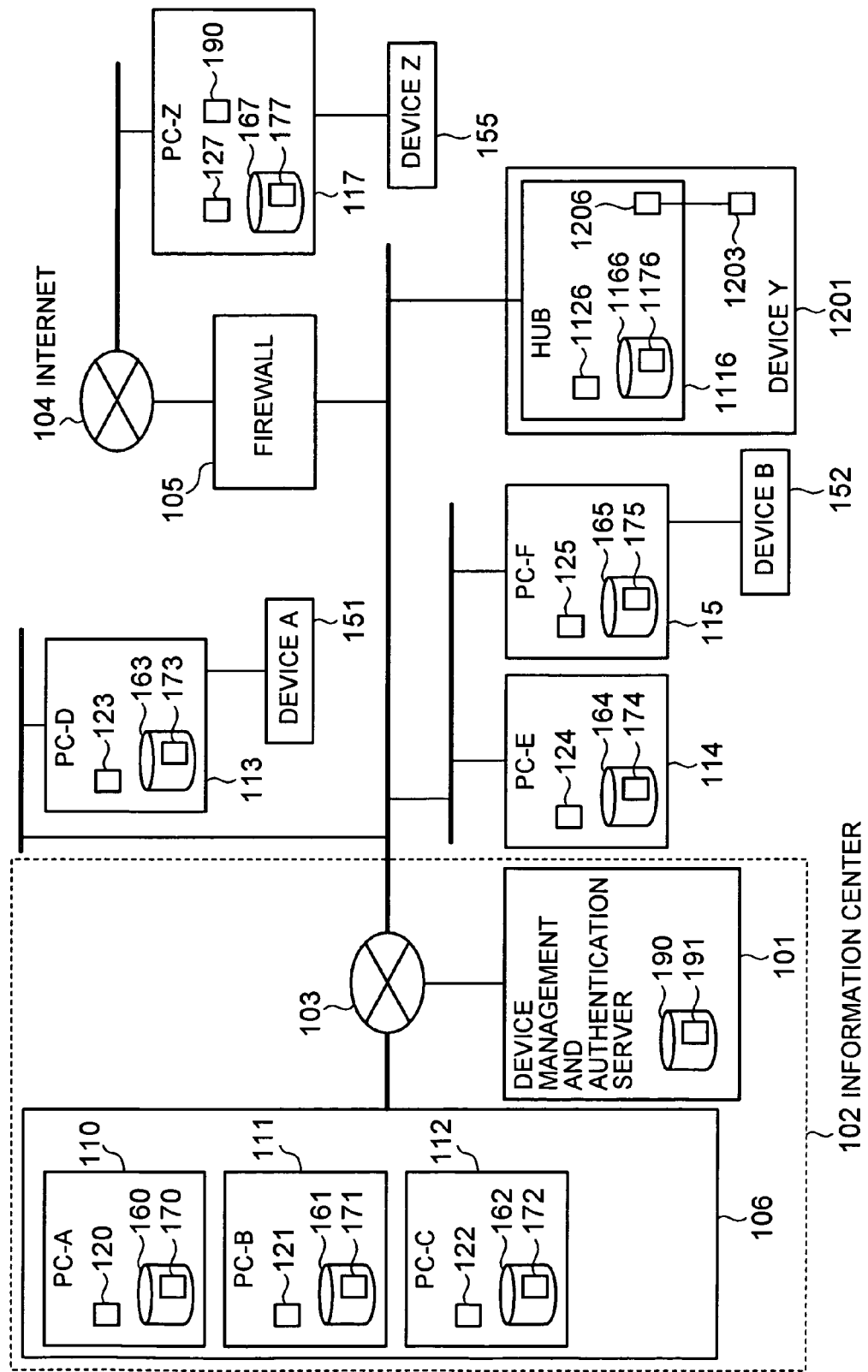
FIG. 14 is a block diagram of the device management system of the third embodiment.

FIG. 14 is a detailed block diagram of the device management system of the present embodiment. As shown in this figure, the device management system of the present embodiment includes, as in the case of the device management system of the second embodiment, a device Y 1201 that is a peripheral instrument, for example, a storage device such as a CD-ROM drive, or a human interface device such as a keyboard and display. The device Y 1201 includes a hub 1116 that is coupled to the network 103 through a network interface, not shown, and has a storage unit 1166 such as a hard disk drive or flash memory as well as a memory and CPU, not shown, to perform computing operations.

The device Y 1201 of the present embodiment further includes a near-field intrabody authentication apparatus 1206 in the hub 1116 and a near-field intrabody communication transceiver/receiver 1203 outside the hub 1116 but in the device Y 1201.

The user wears a near-field intrabody communication transceiver, not shown, and touches the near-field intrabody communication transceiver 1203 of the device Y 1201. Authentication information is sent and received between the following instruments in the listed order for user authentication: the device management and authentication server 101, the near-field intrabody communication authentication apparatus 1206, the near-field intrabody communication transceiver 1203, and the near-field intrabody communication transceiver, not shown, that the user wears.

In the present embodiment, the device Y 1201 is available as a device of a PC on the network 103 only when the authentication has been successfully completed.

As described above, the device management system shown in the present embodiment further provides convenience of direct connection of a device having a near-field intrabody communication authentication apparatus and near-field intrabody communication transceiver, such as the device Y 1201, to the network 103, while having the feature of the device management system shown in the second embodiment.

With this convenience, the device management system shown in the present embodiment, while having the feature of the device management system shown in the second embodiment, can be used as a device of a PC on the network 103 simply by the user's action of touching the device to be authenticated, providing further increased safety and user convenience.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. A device management system used to provide a user with permission to control a device, through a network, by receiving authentication to control the device, the device management system comprising:
    a first server comprising:
        a virtual device management means;
        an application means that executes an application program; and
    a client computer A comprising:
        login management means that sends and receives user information, regarding a user of the client computer A, to and from the application means of the first server,
        wherein the client computer A sends an execution request to the first server to execute the application program, and a result of the execution is returned to the client computer A; and
    an authentication server comprising:
        a device information table that manages a usage status of the device and holds an indication of whether or not an exclusive control is required for the device,
        wherein the authentication server authenticates that the client computer A has permission to use the device; and
    a client computer B comprising:
        a device management means that sends and receives data, to and from a device driver within the client computer B, to at least one of the first server or the authentication server, in order for the client computer A to receive permission to control the device, wherein the device is coupled to the client computer B;
    wherein the device management means, upon receiving a control request for the device, sends data regarding the device received from the device driver, to the authentication server, and the authentication server registers the data regarding the device to the device information table, and
    the virtual device management means, upon receiving the control request from the client computer A, obtains information regarding the device from the device information table in the authentication server, and manages the usage status of the device based on the obtained information regarding the device, and upon receipt of the usage status information of the client computer A, sends the user information to the authentication server, and
    the authentication server upon receipt of the user information by the virtual device management means, updates the device information table and extracts device information regarding a permissible device that has permission to be used, by the user of the client computer A, from the updated device information table, and
    the first server receives information regarding the permissible device, and establishes a communication path, for using the device through the network, from the information regarding the permissible device;
    wherein if the permissible device requires exclusive control, the usage status in the device information table indicates that the communication path is to be exclusively used by the user of the client computer A, and the device management means of the client computer B sends information regarding the usage status of the permissible device to the authentication server; and the authentication server updates the device information table based on the usage status of the permissible device.

2. The device management system according to claim 1, wherein the client computer A sends the first server a device usage request, which is a request for using the device, along with the device information, and the virtual device management means further comprises operation checking instruction means that, when the first server provided with the virtual device management means receives the device usage request, sends an operation checking instruction, for checking the operation of the device identified by the device usage request, to the device management means of the client computer B to which the device is coupled over the communication path; and a communication state monitoring means that monitors whether or not communication using the communication path is successfully performed; and a first irregularity notification means that, if a reply in response to the operation checking instruction indicates that at least one of the operational state is irregular, or if the monitoring in the communication state monitoring means detects that the communication is failed more than predetermined number of times, notifies the authentication server accordingly, and a means for blocking a communication to and from the device management means, if the monitoring in the communication state monitoring means detects that the communication has failed more than a predetermined number of times.

3. The device management system according to claim 2, wherein the device management means comprises;

a monitoring means that, after the communication path has been created, monitors the state of the communication over the communication path and the operational state of the device, coupled to the client computer B, provided with the device management means; and a second irregularity notification means that notifies the authentication server accordingly if the monitoring performed by the monitoring means detects an irregular state.

4. The device management system according to claim 3, wherein the authentication server, if notified of the irregular state from at least one of the first irregularity notification means or the second irregularity notification means, deletes from the device information table, a device in the irregular state and a device with which the communication path in the irregular state is in communication.

5. The device management system according to claim 4, wherein each of the virtual device management means and the authentication server comprises log holding means that records events as a log, and the authentication server further comprises a display means that collects and displays the log recorded in both the log holding means of the authentication server and the virtual device management means.

* * * * *